US012636860B2

(12) United States Patent
Hu et al.

(10) Patent No.: US 12,636,860 B2
(45) Date of Patent: May 26, 2026

(54) SHEET STRUCTURE INCORPORATING GRAPHITIC MATERIAL, AND METHOD OF MANUFACTURE

(71) Applicant: ORA GRAPHENE AUDIO INC., Montréal (CA)

(72) Inventors: Kaiwen Hu, Montréal (CA); Xinda Li, Montréal (CA); Robert-Eric Gaskell, Montréal (CA)

(73) Assignee: ORA GRAPHENE AUDIO INC., Montréal (CA)

( * ) Notice: Subject to any disclaimer, the term of this patent is extended or adjusted under 35 U.S.C. 154(b) by 504 days.

(21) Appl. No.: 17/927,717

(22) PCT Filed: Jun. 1, 2021

(86) PCT No.: PCT/CA2021/050742
§ 371 (c)(1),
(2) Date: Nov. 24, 2022

(87) PCT Pub. No.: WO2021/243449
PCT Pub. Date: Dec. 9, 2021

(65) Prior Publication Data
US 2023/0211579 A1     Jul. 6, 2023

Related U.S. Application Data

(60) Provisional application No. 63/033,314, filed on Jun. 2, 2020.

(51) Int. Cl.
*B32B 9/00* (2006.01)
*B32B 3/26* (2006.01)
(Continued)

(52) U.S. Cl.
CPC .............. *B32B 9/007* (2013.01); *B32B 3/263* (2013.01); *B32B 7/12* (2013.01); *B32B 9/042* (2013.01);
(Continued)

(58) Field of Classification Search
CPC ........... B32B 9/007; B32B 3/263; B32B 7/12; B32B 9/042; B32B 9/045; B32B 9/046;
(Continued)

(56) References Cited

U.S. PATENT DOCUMENTS 5,080,743 A * 1/1992 Odajima .............. H04R 31/003
156/244.11
9,382,117 B2 7/2016 Zhamu et al.
(Continued)

FOREIGN PATENT DOCUMENTS

CA 3036473 9/2019
CN 103794204 A 5/2014
(Continued)

OTHER PUBLICATIONS

Azo, Reduced Graphene Oxide: Properties, Applications and Production Methods, Jul. 22, 2015, https://www.azonano.com/article.aspx?ArticleID=4041 (Year: 2015).*
(Continued)

*Primary Examiner* — Michael Zhang
(74) *Attorney, Agent, or Firm* — NORTON ROSE FULBRIGHT CANADA LLP

(57)     ABSTRACT

This specification presents sheets including graphitic materials, including sandwich structures, thermoformed or wet-formed single layer or multilayer structures of graphitic materials, and methods of forming a layer of graphitic material. In accordance with one aspect, the specification presents a multi-layer structure comprising a core layer having a core density between 0.01 and 1 g/cm$^3$; and a skin
(Continued)

layer covering the core layer, the skin layer having at least 10% by weight of a graphitic material, the graphitic material having one or more of graphene oxide, reduced graphene oxide, graphene, graphite oxide, reduced graphite oxide and graphite, the skin layer having a skin density of between 0.5 and 2 g/cm$^3$, a thickness ratio of the skin layer to the core layer being of between 1:1000 and 1:1.

35 Claims, 12 Drawing Sheets

(51) Int. Cl.

| | |
|---|---|
| *B32B 7/12* | (2006.01) |
| *B32B 9/04* | (2006.01) |
| *B32B 23/22* | (2006.01) |
| *B32B 27/28* | (2006.01) |
| *B32B 27/30* | (2006.01) |

(52) U.S. Cl.
CPC .............. *B32B 9/045* (2013.01); *B32B 9/046* (2013.01); *B32B 23/22* (2013.01); *B32B 27/285* (2013.01); *B32B 27/30* (2013.01); *B32B 27/306* (2013.01); *B32B 2266/04* (2013.01); *B32B 2307/72* (2013.01); *B32B 2307/732* (2013.01); *B32B 2317/18* (2013.01); *B32B 2329/04* (2013.01)

(58) Field of Classification Search
CPC ....... B32B 23/22; B32B 27/285; B32B 27/30; B32B 27/306; B32B 2266/04; B32B 2307/72; B32B 2307/732; B32B 2317/18; B32B 2329/04; B32B 2603/00; B32B 15/20; B32B 2255/26; B32B 2266/0257; B32B 7/03; B32B 15/046; B32B 2605/08; B32B 2607/00; B32B 5/18; B32B 2255/102; B32B 2307/102; B32B 2457/00; B32B 2605/00; B32B 2605/18; B32B 21/04; B32B 27/28; C01B 32/21; C01B 32/198; C01B 32/20
See application file for complete search history.

(56) References Cited

U.S. PATENT DOCUMENTS

| | | | | |
|---|---|---|---|---|
| 2001/0050194 A1* | 12/2001 | Ishihara | .................... | H04R 7/00 181/167 |
| 2006/0220320 A1* | 10/2006 | Potier | ..................... | B32B 18/00 277/308 |
| 2013/0108817 A1* | 5/2013 | Bernhard | ............. | C08F 220/42 521/149 |
| 2017/0051185 A1 | 2/2017 | Ling et al. | | |
| 2017/0106342 A1* | 4/2017 | Raveendran-Nair | ........................ | B01D 67/0044 |
| 2017/0251318 A1* | 8/2017 | Gaskell | .................... | H01B 1/04 |
| 2022/0267156 A1* | 8/2022 | Lu | .......................... | C01B 32/198 |

FOREIGN PATENT DOCUMENTS

| | | | | | |
|---|---|---|---|---|---|
| CN | 106412775 | A | 2/2017 | | |
| CN | 108250473 | | 1/2018 | | |
| CN | 107882196 | A | 4/2018 | | |
| CN | 109257684 | A * | 1/2019 | ............. | H04R 7/127 |
| WO | 2016054723 | | 4/2016 | | |
| WO | 2017201482 | | 11/2017 | | |
| WO | 2018160871 | | 9/2018 | | |
| WO | 2018195658 | | 11/2018 | | |
| WO | WO-2018195658 A1 * | | 11/2018 | ....... | B01D 67/00046 |

OTHER PUBLICATIONS ip.com translation of CN-109257684-A (Year: 2025).*
Office Action from Corresponding CN 2021800577981.
English Translated Abstract of CN109257684A.
English Translated Abstract of CN106412775A.
English Translated Abstract of CN103794204A.
English Translated Abstract of CN107882196A.
Dikin, D., Stankovich, S., Zimney, E. et al. Preparation and characterization of graphene oxide paper. Nature 448, 457-460 (2007).

* cited by examiner

Graphitic material
Polymer
Cross-linker

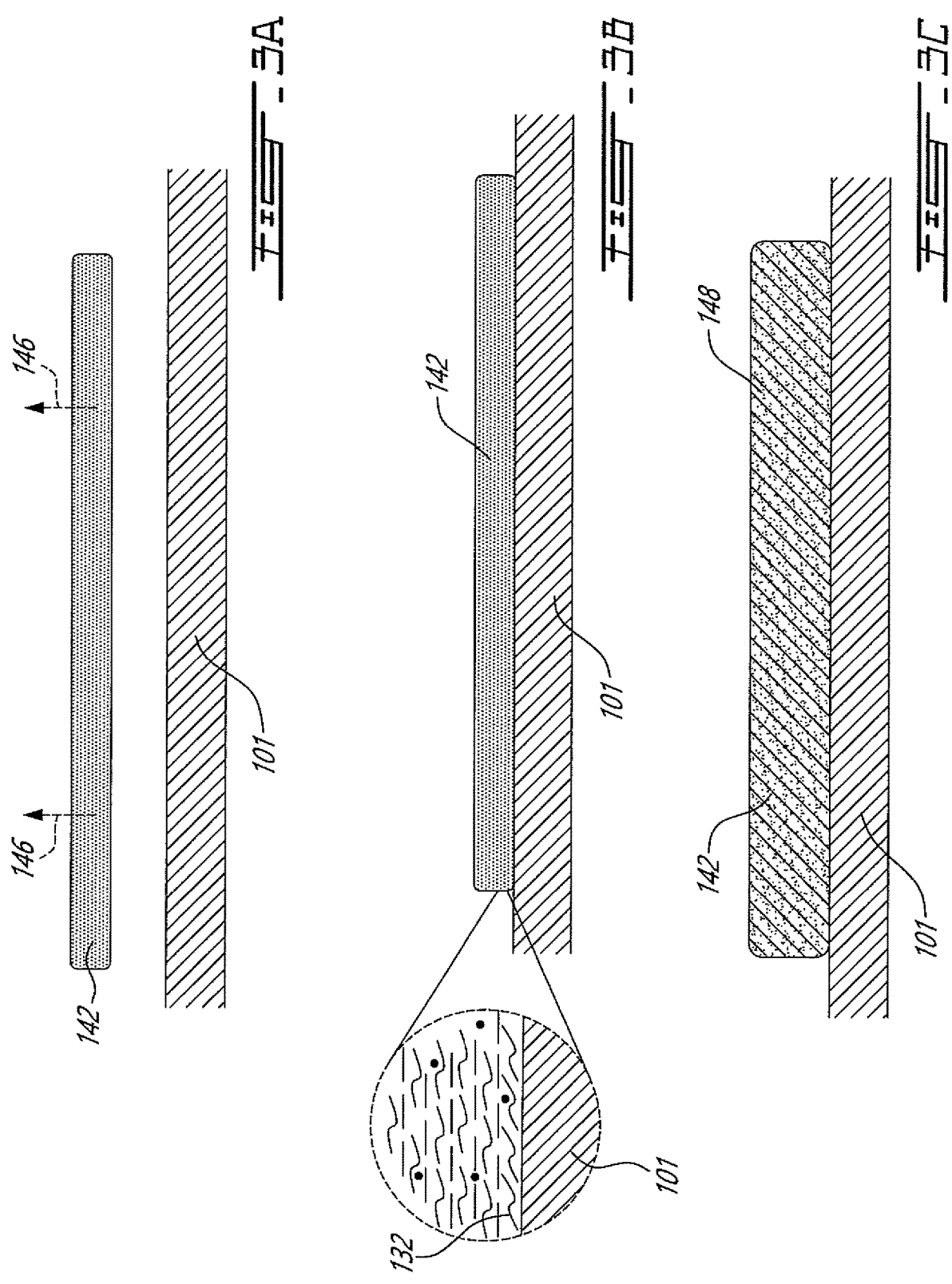

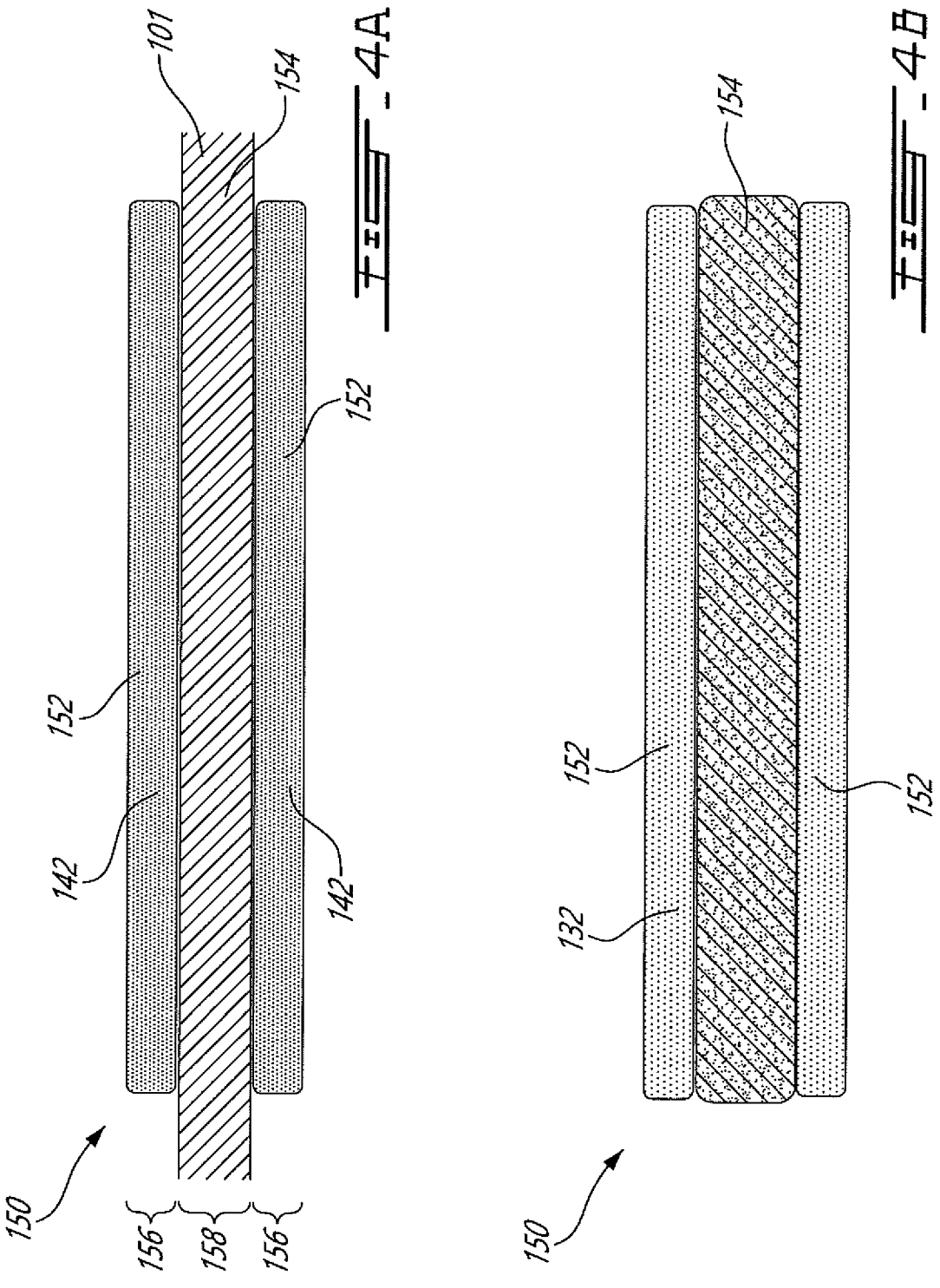

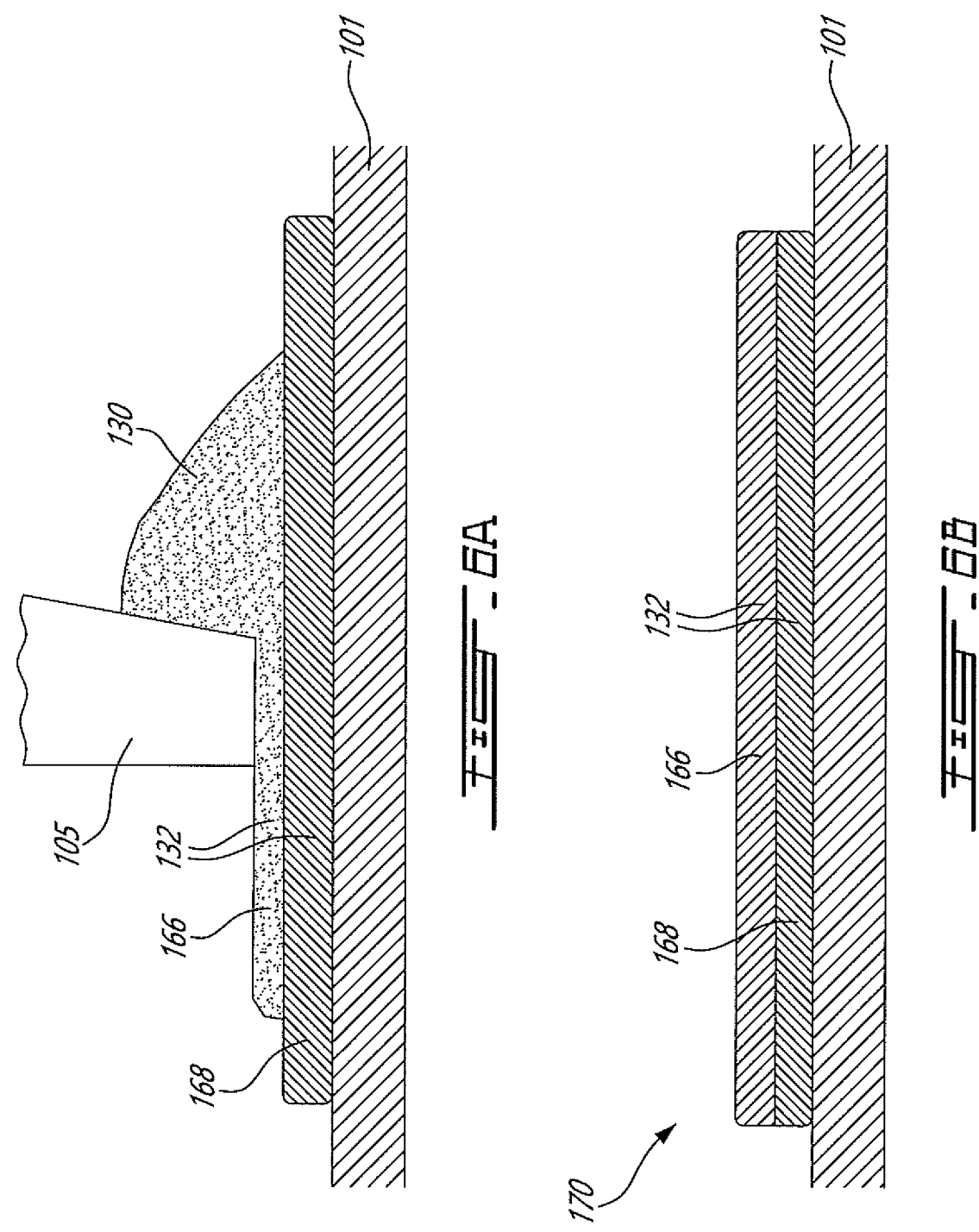

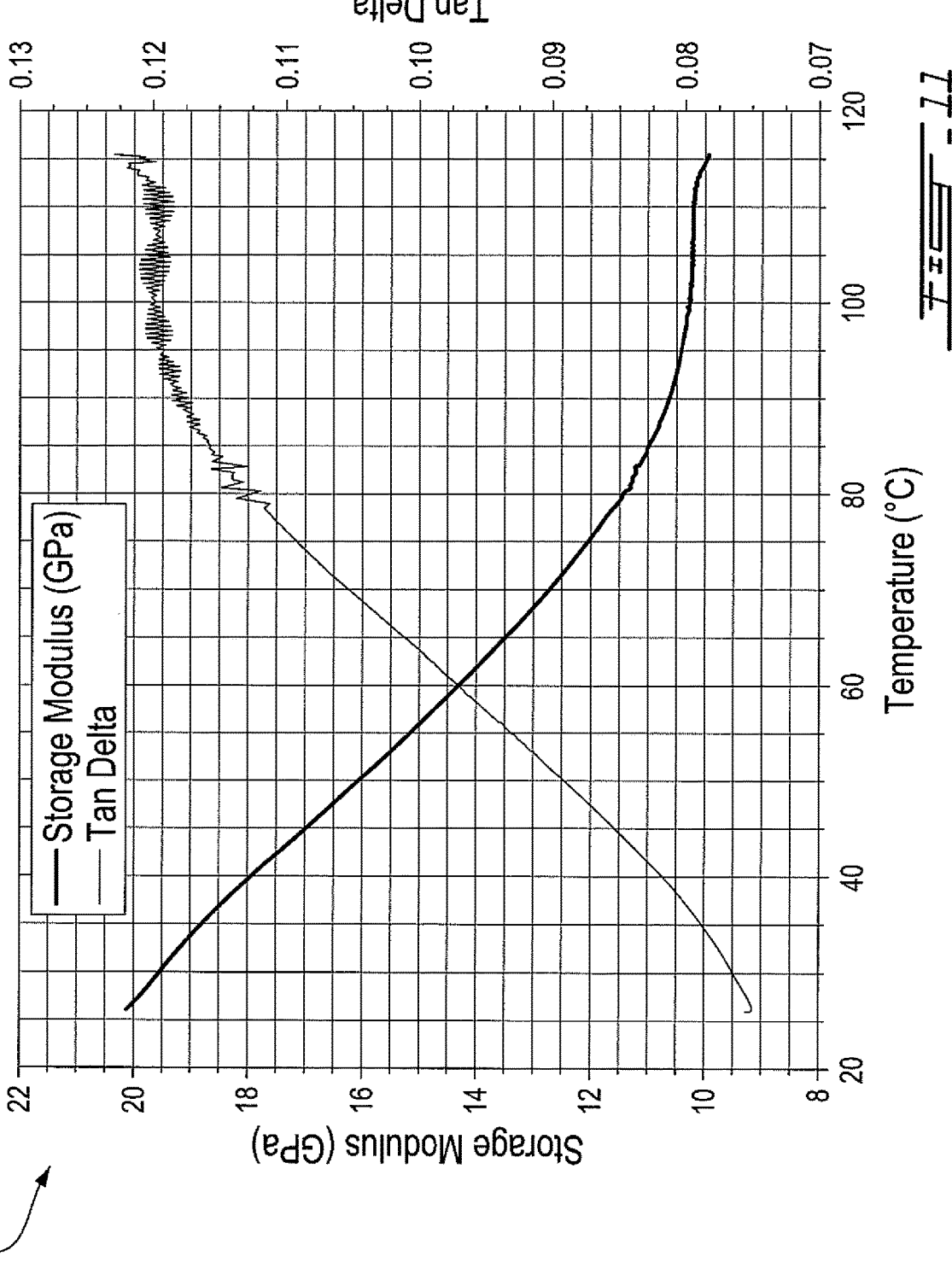
_FIG. 11_

SHEET STRUCTURE INCORPORATING GRAPHITIC MATERIAL, AND METHOD OF MANUFACTURE

BACKGROUND

Graphite is a crystalline form of carbon formed of a stack of 2D lattices of sp²-hybridized carbon organized in a hexagonal structure. In its thinnest expression, a single layer of the hexagonal structure of graphite is referred to as graphene. Depending on the context, structures having up to 10, and even in some cases up to one hundred layers of the hexagonal structure can continue to be referred to as graphene, and the frontier between graphite and graphene can thus be fuzzy. In this specification, structures having up to 10 layers of graphene will be referred to as graphene, and structures having more than 10 layers of graphene will be referred to as graphite. Likely due to the thickness distinction between the two, it is common to refer to particles of graphite as "flakes" and to particles of graphene as "sheets".

Graphite oxide is a compound of carbon, oxygen and hydrogen in variable ratios. The carbon mass percentage is commonly around 45% and the typical carbon to oxygen ratio can be between 1.8 and 2.9 in accordance with some common definitions which can be retained herein. The native functional groups on graphite oxide include hydroxyls, epoxides, carbonyls, carboxylic acids and organosulfates. Graphene oxide is also a compound of carbon, oxygen and hydrogen in similar ratios to graphite oxide, given the similarity between the materials. Reduced graphite oxide, and reduced graphene oxide are similar to their graphite oxide and graphene oxide counterparts, except for the fact that they have gained electrons (exhibit a decrease in their oxidation state) which is typically achieved by chemical, thermal, photo, hydrothermal reduction or combination of different categories of reduction.

The expression "graphitic material" will be used herein to refer to a material including one or more of graphene, graphite, graphene oxide, graphite oxide, reduced graphene oxide and reduced graphite oxide.

Graphitic materials can be used in different applications including, energy storage, sensing, water purification and many others. Some or all of these materials, thanks to their functional groups and morphology, can self-assemble into macroscopic paper-like laminates with interesting properties including high electrical/thermal conductivities, high stiffness to density ratios, and molecular sieving.

Although known graphitic material uses and fabrication techniques were suitable to a certain degree, there always remains room for improvement.

SUMMARY

In accordance with one aspect, there remained a need for new structures incorporating graphitic material. It was found that incorporating graphitic material in multilayer structures, such as in a sandwich structure with a lower density core and one or more skins, with the graphitic material as the skin(s), or the graphitic material as both core and skin(s), could satisfy such a need to a certain extent. Moreover, such a structure could find uses in various applications, such as acoustic transducers and construction materials, such as acoustic insulation to name some examples.

In accordance with another aspect, there remained a need for a manufacturing technique which would allow changing the initial, typically planar, shape of a sheet having at least one layer of graphitic material into a more complex shape, such as can be desirable to provide structural rigidity in the manufacture of an acoustic transducer or other device, for instance.

In accordance with still another aspect, there remained a need for a composition of matter in the form of a sheet including graphitic material and which was well adapted for forming into a more complex shape subsequently to its initial deposition. It was found that incorporating a polymer with the graphitic material, in particular, could lead to thermoformable and/or wet formable properties of the resulting material, which could make the sheet particularly suitable for use as a membrane of an acoustic transducer.

It was further found that forming graphitic material into more complex structures and geometries can bring significant benefits to the overall performance of a membrane in a device. For instance, a sandwich structure including two stiff outer skins of graphitic material and a porous core can be useful in panel applications subjected to flexural loads. Another example is an acoustic transducer, where usually a shaped acoustic diaphragm (cone or dome) is used to add geometric stiffness for broadband sound transduction. In both cases, the geometry significantly increases the stiffness to density ratio of the membrane compared to a simple planar geometry.

Accordingly, in accordance with one aspect, there is provided a macroscale sandwich composite comprised of two graphitic material layers as skin layers and a polymer foam material as the core. The properties such as flexural stiffness, damping and density of the sandwich composite can be tuned by the thickness ratio between the skins and the core as well as the chemical composition of the graphitic material that can be comprised of graphene, graphene oxide, or graphitic composites with or without additives.

In accordance with another aspect, there is provided a macroscale sandwich composite comprised of two stiff skin layers and a graphitic material foam core. The properties such as flexural stiffness, damping and density of the sandwich composite can be tuned by the thickness ratio between the skins and the core as well as the chemical composition of the graphitic material core that can be comprised of graphene, graphene oxide, graphene aerogel, graphene hydrogel or graphitic composites with or without additives.

In accordance with one aspect, graphitic material fabrication techniques met certain limitations. It was found that at least some of these limitations could be alleviated by using a liquid pre-formulation, including the graphitic materials and a solvent, where one or more crosslinker materials formed part of the graphitic materials, combined with a stress-inducing spreading technique, such as spreading with a doctor blade, rod or roller at a controlled height, once the formulation has been poured onto a substrate. Indeed, the stress inducing technique can drive a self-orientation effect. The cross-linker cross-links the graphene sheets, which can lead to a better Young's modulus in the resulting layer. Indeed, cross-linkers can induce molecular cross-linking between graphene sheets, thereby enhancing stiffness of graphitic materials. Blade casting can be easier, less-costly, more scalable, and can more easily be used to deposit a graphitic material layer on a desired substrate (e.g. lower density core) than other techniques, such as vacuum filtration.

Accordingly, in accordance with one aspect, there is provided a method of making a layer of graphene based material (graphitic material), the method comprising spreading onto a substrate a formulation comprising at least a graphene material and a crosslinker dispersed in a solvent, including orienting the graphene material in a spreading orientation; and drying the solvent.

In accordance with still another aspect, there remained a need for new structures incorporating graphitic material(s). It was found that a graphitic material structure having one or more layer(s) could be made thermoformable by incorporating therein a suitable weight percentage of thermoformable plastic. This can allow for additional flexibility in terms of producing graphitic material(s) in various shapes and sizes. For instance, a planar structure can be produced having one or more layers of a graphitic material incorporating graphene oxide, thermoformable plastic (which can optionally be a cross-linker), and optionally other materials, this structure can be heated, and then moulded or otherwise made into a desired, more complex, shape, in a manner to maintain its shape once it has cooled down. Such a process can open the door for more flexibility, or an alternative manufacturing method, in producing structures or products incorporating graphitic material(s) and having complex shapes, such as an acoustic transducer for instance.

Accordingly, in another aspect, there is provided a membrane having at least one layer of graphitic material including between 10% and 90% by weight of a graphitic material and between 10% and 75% by weight of a polymer having thermoformable properties.

In accordance with another aspect, it was found that a graphitic material structure having one or more layer(s) could be made wet formable by incorporating therein a suitable weight percentage of polymers. This can allow for additional flexibility in terms of producing graphitic material in various shapes and sizes. For instance, a planar structure can be produced having one or more layers of a graphitic material incorporating graphene oxide, polymers (which can optionally be a cross-linker), and optionally other materials. This type of structure can be wetted using water, ethanol or the mixture of two, optionally containing a solvent that can reduce the swelling of the membrane, such as calcium salt, and then moulded or otherwise made into a desired, more complex, shape, in a manner such that it maintains its shape once it has dried. The heat and ventilation can be applied to hasten the drying process.

In accordance with another aspect, there is provided a method of preparing a graphitic material using an improved method that formulates a graphene oxide dispersion with molecular crosslinker(s) and/or polymer(s), depositing the formulation on a substrate with good wetting properties under orientation inducing stress, and drying the solvent. The process can be used to prepare the graphitic material directly on a substrate onto which it is intended to be used, or to prepare the graphitic material onto a temporary substrate from which it is to be detached prior to final assembly.

In accordance with one aspect, the method can be used to produce the sandwich composite by directly depositing the wet graphitic material onto the core material (using the core material as the deposition substrate), wherein the graphitic material can be directly bonded onto the core without the need of adhesives by incorporating polymers into the graphitic material wet formulation.

Advantageously, the method provides a means to tune the isotropy and composition of the final graphitic material structure by depositing multiple layers of graphene suspensions, on top of each other in different casting directions or of different compositions. The variation in composition could include a change in the type of graphene raw materials, a change in additive type or composition. Each layer could represent a different aligning orientation of the graphene sheets or different graphitic material compositions.

Advantageously, the method can be tuned to produce low density graphitic material foams by controlling the capillary drying stress with the use of freeze drying and other surface tension free drying methods. Such methods can be based on drying by sublimation rather than evaporation and can include supercritical drying, for instance.

Another embodiment of the invention provides a type of graphitic material polymer composite that can be made to adhere onto the substrate onto which it is formed. This can be achieved by including a polymer in the formulation. The amount of polymer in the resulting layer can be between 5% and 90% by weight, or between 15% and 60% by weight, for instance.

Another embodiment of the invention provides a type of graphitic material polymer composite that can be thermoformed into shapes, where a certain type of non-flat geometry is desired in the final application. In this case, the thermoplastic polymer comprises at least 20% by weight of the composite. The amount of polymer in the resulting layer can be between 20% and 90% by weight, or between 20% and 70% by weight, for instance.

Advantageously, the method can be further adapted to fabricate the thermoformable graphitic material-polymer composite by adding more than 20% by weight of polymers into the composition of the formulation.

Another embodiment of the invention provides a type of graphitic material polymer composite that can be wet formed into shapes, where a certain type of non-flat geometry is desired in the final application. In this case, the polymer comprises at least 20% by weight of the composite. The amount of polymer in the resulting layer can be between 20% and 90% by weight, or between 20% and 70% by weight, for instance.

Graphitic material sandwich composites show higher stiffness to weight ratios compared to equivalent graphitic material monolayers as well as their aluminum sandwich counterparts. The direct bonding of graphitic material to the core material eliminates the need for an adhesive layer, brings additional weight reduction to the sandwich design and hence further increases the stiffness to weight ratio.

A highly scalable and inexpensive directional solvent casting can be used for graphitic material fabrication, which can be further tailored to become a novel way of making graphitic material sandwiches. The combination of solvent casting, thermoforming, and wet forming represents a new pathway to create graphitic sheets with 3D shapes.

In accordance with still another aspect, there is provided a multi-layer structure comprising a core layer having a core density between 0.01 and 1 g/cm$^3$; and a skin layer covering the core layer, the skin layer having at least 10% by weight of a graphitic material, the graphitic material having one or more of graphene oxide, reduced graphene oxide, graphene, graphite oxide, reduced graphite oxide and graphite, the skin layer having a skin density of between 0.5 and 2 g/cm$^3$, a thickness ratio of the skin layer to the core layer being of between 1:1000 and 1:1.

In accordance with yet another aspect, there is provided a sheet having at least one layer made of a material having between 10% and 90% by weight of graphitic material, the graphitic material having one or more of graphene oxide, reduced graphene oxide, graphite oxide and reduced graphite oxide, and between 10% and 75% by weight of a polymer.

The sheet can have a non-planar shape including a bend forming a closed shape on a surface of the sheet. Further, the bend of the sheet can have a truncated cone shape.

The polymer can be present in a proportion of at least 1:9 of the graphitic material by weight. The proportion of polymer can be of no more than 3:7. The polymer can be present in a proportion of at least 3:7 of the graphitic material by weight. The polymer can be polyethylene glycol (PEG). The polymer can be polyethylene glycol (PEG) and present in a proportion of at least 3:7 of the graphitic material by weight.

The polymer can consist of one or more of polyethylene glycol (PEG), sodium, cellulose ether, Polyvinyl-alcohol (PVA), Polyvinylpyrrolidone (PVP) and polyethylenimine (PEI). The polymer can be cellulose ether. The cellulose ether being selected from a group consisting of carboxymethylcellulose (CMC), hydroxypropymethlylcellulose (HPMC), Methylcellulose (MC), Hydroxypropylcellulose (HPC) and Hydroxyethylcellulose (HEC).

The material of the sheet can include between 25% and 50% by weight of the polymer. The material can include at least 20% by weight of one or more of graphene oxide, reduced graphene oxide, graphite oxide and reduced graphite oxide. The sheet can include a plurality of superposed layers. The sheet can form an acoustic transducer diaphragm in an electronic device. The material of the sheet can have graphitic material having one or more of graphene oxide, reduced graphene oxide, graphite oxide and reduced graphite oxide can be one or more of graphite oxide and reduced graphite oxide.

In accordance with yet another aspect, there is provided a method of fabricating a diaphragm, the method comprising providing a sheet having at least one layer comprising at least 10% by weight of one or more of graphene oxide, reduced graphene oxide, graphite oxide and reduced graphite oxide; softening the sheet; forming the softened sheet using a mold; and solidifying the formed sheet into a diaphragm.

Softening can include heating the sheet and solidifying can include cooling the formed sheet. Softening can include wetting the sheet and solidifying can include drying the formed sheet. The mold in the forming step can impart at least one or more of a non-gaussian curvature, ribs and closed shaped bends. The mold in the forming step can impart the closed shaped bends defining a cone-shaped section in the formed sheet. The mold in the forming step can impart the closed shaped bends defining a circular section in the formed sheet. The mold in the forming step can impart the closed shaped bends defining a rectangular section in the formed sheet.

The sheet in the method can have at least one sheet of a material having at least 20% by weight of a graphitic material of one or more of graphene oxide, reduced graphene oxide, graphite oxide and reduced graphite oxide. The graphitic material can be one of graphene oxide or reduced graphene oxide. The material of the sheet can include a polymer. The polymer can be selected from one or more of polyethylene glycol (PEG), cellulose ethers, carboxymethylcellulose (NaCMC), hydroxypropymethlylcellulose (HPMC), Methylcellulose (MC), Hydroxypropylcellulose (HPC), Hydroxyethylcellulose (HEC), Polyvinyl-alcohol (PVA), Polyvinylpyrrolidone (PVP) and polyethylenimine (PEI).

The polymer can have one of a thermoforming properties and wetting properties, and can be present in a polymer to graphitic material proportion of between 1:99 and 4:1 by weight. The proportion can be between 1:19 and 4:1. The proportion can be between 1:19 and 3:1. The proportion can be between 1:9 and 3:7. The proportion can be between 1:19 and 1:1. The polymer can be cellulose ester. The polymer can be cellulose ester and have a proportion between 1:19 and 1:1. The proportion can be between 1:9 and 4:1. The proportion can be between 3:7 and 7:3. The polymer can be polyethylene glycol (PEG). The polymer can be polyethylene glycol (PEG) and have a proportion between 3:7 and 7:3.

The sheet in the method can be a multi-layer structure having at least two layers, and wherein the polymer has adhesive properties relative to an adjacent one of the layers of the multi-layer structure.

The method can further comprise spreading onto a substrate a formulation comprising at least a graphitic material and a cross-linker dispersed in a solvent, including orienting the graphitic material in a spreading orientation; and drying the solvent. The graphitic material can represent 0.5% to 10% by weight of the formulation. The solvent can represent between 90% and 99.5% by weight of the formulation. The cross-linker can be present in a concentration of between 2 and 30 millimolar per gram of graphitic material. The cross-linker can be selected from one or more of boric acid (BA), borax(BX), calcium salt, dialdehyde, glyoxal, glutaraldehyde (GA),dicarboxylic acids, diamines. The formulation can comprise a polymer dispersed in the solvent, the polymer being the cross-linker. In one aspect, subsequent to the said drying in the previous aspect, the formulation can form a layer which is adhered to the substrate via the polymer. The substrate can be a porous material. The solvent can be selected from the group consisting of water, low molecular weight alcohol and dimethylformamide. Prior to said spreading, the method can include pouring the formulation onto the substrate. Said spreading can include applying the formulation using a roller, including moving the roller in a plane parallel to the substrate, at a constant distance from the substrate. The method can further include peeling the layer of graphitic material subsequently to said drying of the solvent. Said drying of the method can include evaporating the solvent. Evaporating the solvent can include sublimating the solvent. Sublimating the solvent can be performed by freeze-drying. Sublimating the solvent can be performed by supercritical drying. Subsequently to drying in the method, the formulation can form a first layer, and the method can further comprise repeating the method to form a second layer of graphitic material using the first layer of graphitic material as the substrate.

Said spreading can be performed in a first orientation parallel to the substrate, and said repeating the method can include spreading the formulation in a second orientation parallel to the substrate. The second orientation can be opposite the first orientation. The drying of the method can include sublimating and said repeating of the method can include evaporating the solvent in a manner for the second layer to be denser than the first layer.

Many further features and combinations thereof concerning the present improvements will appear to those skilled in the art following a reading of the instant disclosure.

DESCRIPTION OF THE FIGURES

In the figures,

FIGS. 3A, 3B and 3C present peeling of a formed layer from the substrate, bonding of the layer to the substrate and formation of foam by freeze drying, respectively.

FIGS. 4A and 4B are schematic illustrations presenting the configuration of a sandwich structure including: FIG. 4A being a sandwich configuration with two graphitic material skin layers adhered to the top and bottom surface of a foam material, and FIG. 4B being a sandwich configuration with two skin layers and a graphitic material foam core;

FIG. 5A showing the graphitic material sandwich composite made through blade casting on both sides of the foam, and FIG. 5B showing the graphitic material sandwich composite made through simultaneous roll coating on both sides of the foam;

FIGS. 6A and 6B present an embodiment of the multilayer deposition technique during casting and after evaporation, respectively;

FIG. 11 is a graph showing the dynamic mechanical analysis (DMA) temperature sweep of a formable material.

DETAILED DESCRIPTION

Figures 1A, 1B:
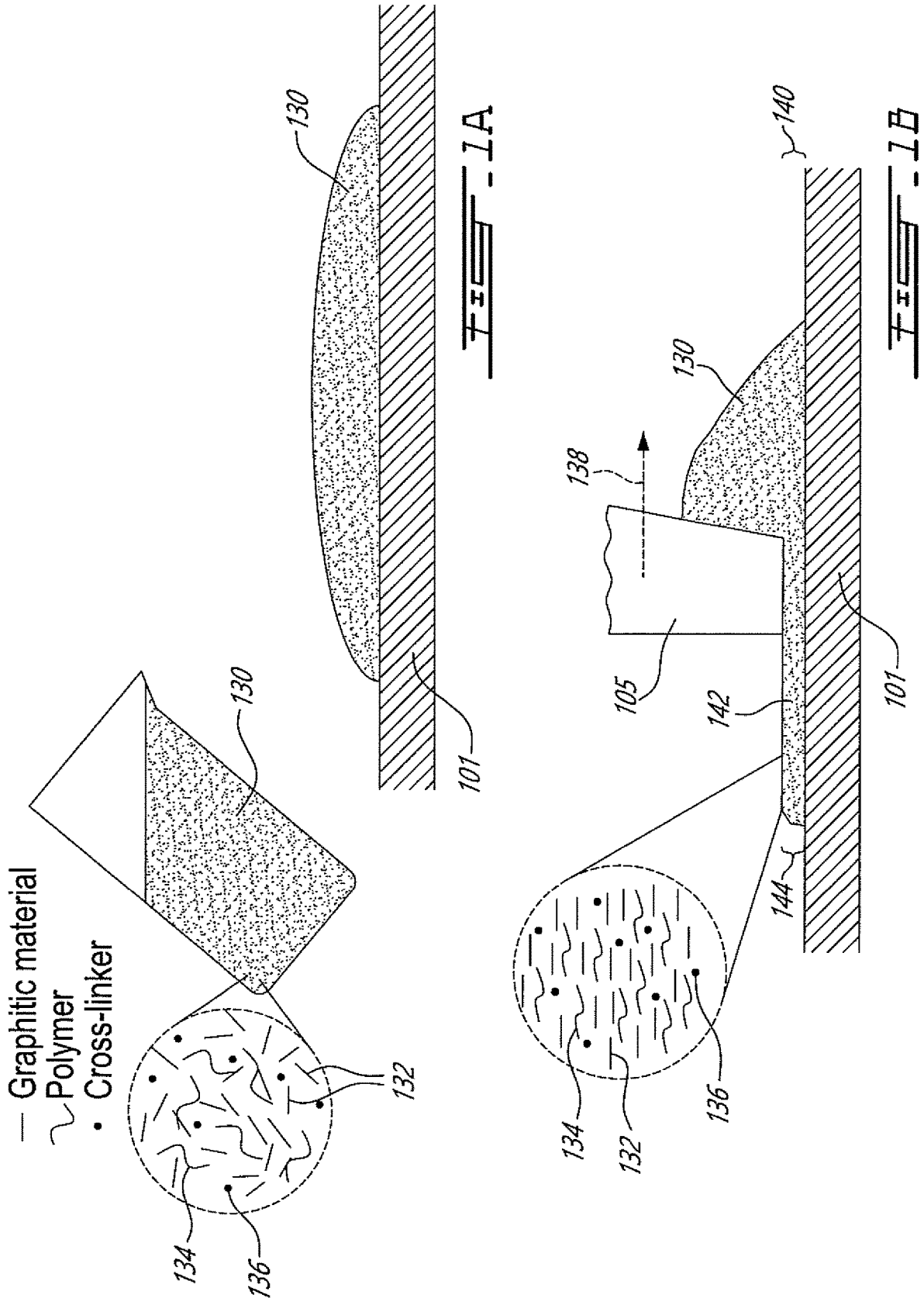
FIGS. 1A and 1B illustrate an embodiment of a casting process including preparation, pouring and casting (spreading) of a material formulation including graphitic material, and forming a layer in accordance with one example.

FIGS. 1A and 1B present an example method which can be used to form a sheet using solvent casting. First, a graphitic formulation 130 is prepared. The formulation 130 can include graphitic material 132, i.e. one or more of graphene oxide, reduced graphene oxide, graphene, graphite oxide, reduced graphite oxide and graphite dissolved in a solvent. The graphitic material 132 is generally shown in FIGS. 1A and 1B as a straight solid line. The formulation 130 can also include one or more other materials, such as a polymer 134 for instance, examples of which will be presented below and which is shown in FIGS. 1A and 1B as a jagged line, which are also intended to form part of the material of the sheet. The materials and the solvent can be referred to collectively as a graphitic formulation 130.

In one example, a highly stable concentrated (e.g. from 0.5 wt % to 10 wt %) graphene formulation can be dissolved in a solvent (e.g. from 90 to 99.5 wt %) such as water, low molecular weight alcohol or Dimethylformamide (DMF). The graphene formulation 130 can include a graphitic material 132, such as graphene oxide, and one or more cross-linker(s) 136, generally shown in FIGS. 1A and 1B as dots. The cross-linkers 136 can be molecular cross-linkers, such as boric acid (BA), borax (BX), calcium salt, glyoxal, glutaraldehyde (GA), and melamine, and/or polymer cross-linkers, such as polyethylene glycol (PEG), cellulose ethers including but not limited to carboxymethylcellulose (CMC), hydroxypropymethlylcellulose (HPMC), Methylcellulose (MC), Hydroxypropylcellulose (HPC), Hydroxyethylcellulose (HEC), Polyvinyl-alcohol (PVA), Polyvinylpyrrolidone (PVP) and polyethylenimine (PEI). The formulation 130 can also include ascorbic acid, ascorbate salts, and/or dopamine and/or other reducing agents. The amount of cross-linker(s) 136 can be small compared to the amount of graphitic material 132, and in some embodiments, it can be in the rage of 300 Da to 5 MDa, for instance. In other embodiments, the cross-linker(s) 136 can be present in a concentration of between 0.01 and 30 percent weight per gram of graphitic material 132. In another embodiment, the range of cross-linker(s) 136 concentration in the formulation 130 can be from 2 to 30 millimolar (mM) per gram of graphitic material 132. The pH can be adjusted by ammonia or other bases depending on the use of the cross-linker(s) 136 and additives. The formulation 130 can be poured onto a suitable substrate 101. In one embodiment, the substrate 101 can be plastic, glass, metal, ceramic or a foam, for instance.

The substrate 101 can be selected in a manner to optimize the desired results. The substrate 101 can be treated by techniques to increase the surface energy, such as UV-ozone and oxygen plasma treatment. Typically, a substrate 101 having good wetting properties will be preferred, such as a substrate having a surface energy above 38 mN/m, such as a substrate 101 which is hydrophilic.

As shown in FIG. 1B, subsequently to pouring, the formulation 130 can be spread and scraped uniformly in one direction using a thickness-controlled casting apparatus with a shearing element 105 like a blade, rod or roller, which is displaced 138 relative to the substrate 101, in the plane of the substrate, at a given height relative to the substrate 101, such as to define a gap 140. Some graphitic materials 132, such as graphene oxide for instance, can be in the form of flat particles such as sheets or flakes, and the shear during casting can align the flakes or sheets in the casting direction, as is perhaps best seen in FIG. 1B, when the graphene flakes form a nematic liquid crystalline phase in the formulation. This process can allow to obtain a resulting sheet 142 in which the particles of the graphitic material 132 are substantially oriented parallel to one another, and the general orientation of the particles of the graphitic material 132 can be controlled via the orientation of the displacement 138 of the shearing element 105. The thickness 144 of the resulting sheet 142 can depend on both the size of the gap 140 between the shearing element 105 of the thickness-controlled casting apparatus and the substrate 101, and the concentration of the active material in the formulation 130 (concentration of substances in the solvent). Typically, a thicker (more viscous) paste will yield a material sheet 142 which is thicker. The gap 140 between the shearing element 105 and the substrate 101 can be of between 0.1 μm and 2 cm, for instance. The active materials can include graphitic material 132, cross—linker(s) 136, polymers 134, additives, etc. Example embodiments using a higher concentration of polymers 134 will be presented below.

After the spreading, the solvent is passively allowed to, or actively made to evaporate. It will be noted here that in one embodiment, the solvent can be allowed to evaporate naturally, and heat and ventilation can be applied to hasten this process. This can lead to a dense sheet, as the active materials in suspension can progressively condense as the solvent evaporates. In another embodiment, it can be preferred to use an evaporation technique which controls the evaporation stress/capillary drying stress, such as freeze drying or supercritical drying. This can produce a resulting sheet that is porous/less dense, such as a graphitic material foam, an example of which is shown in FIG. 3c and discussed below.

Figure 2:
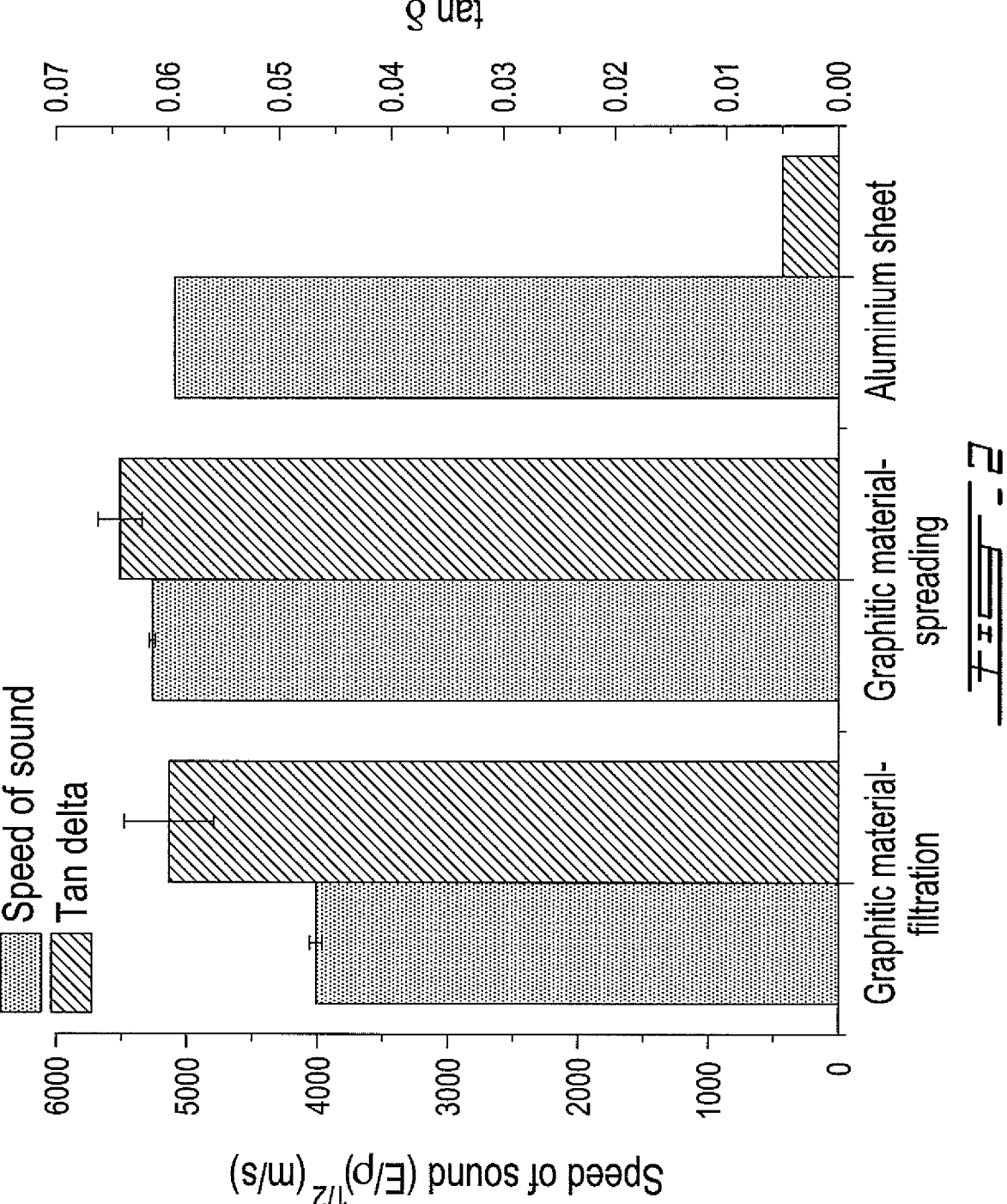
FIG. 2 is a graph showing the mechanical properties of material prepared using the process presented in FIGS. 1A and 1B, in comparison with different reference materials.

FIG. 2 compares speed of sound values and damping (tan δ) of three materials: a first sheet made of graphitic material formed by filtration (Graphitic material—filtration), a second sheet made of graphitic material incorporating a cross-linker and formed by spreading with a doctor blade and natural evaporation (Graphitic material—spreading), and an aluminum sheet. As shown in FIG. 2, dynamic mechanical analysis (DMA) measurement data of the second sheet (Graphitic material—spreading) demonstrates slightly higher speed of sound (stiffness to density) and an order of magnitude higher damping than a sheet of light metal like Aluminum (Aluminum Sheet).

The sheet can either be deposited on a substrate which is intended to form part of the end-use product, or on a temporary substrate and then peeled off from the temporary substrate. FIG. 3A shows an example step of peeling off 146 (or otherwise detaching) the sheet 142 from the substrate 101. If the sheet 142 is peeled off from the substrate 101, it can then be adhered to the same or another substrate via an adhesive, or used alone as a freestanding sheet. If the sheet 142 is directly deposited on a substrate 101 intended to form part of the end-use product, it may be preferred to favor a relatively strong bonding between the sheet 142 and the substrate 101. A relatively strong bonding can be favored by choosing a substrate 101 which is porous or otherwise has a relatively rough surface/high roughness. Very smooth surfaces will typically impede adherence. The substrate can be made of materials such as plastic, glass, metal, ceramic, and perhaps even wood. Another factor which can significantly affect the adherence between the sheet 142 and the substrate 101 is the incorporation of a polymer 132 in the formulation 130.

As perhaps best seen in FIG. 3B, the addition of polymers 132 can increase bonding between the substrate 101 and the sheet 142 after drying. In particular, the graphitic material sheet 142 can become permanently bonded to foam materials such as those made of Polymethacrylimide (PMI) and porous polymeric sheets such as polyether sulfone (PES), Polyvinylidene fluoride (PVdF), nylon, Polytetrafluoroethylene (PTFE), polypropylene (PP) in the dry state. In certain embodiments, it can be desirable for the polymer to be present in a proportion of between 1:19 and 3:1 of the graphitic material, or in a proportion between 1:9 and 3:7 with respect to the graphitic material. In an alternate embodiment, an adhesive layer can cover the substrate 101 and be used to bond the sheet 142 to the substrate 101.

As perhaps best seen in FIG. 3C, a low-density graphitic material foam sheet 148 can be formed when freeze drying or supercritical drying techniques are used to dry the wet layer instead of solvent evaporation.

Reference will now be made to FIGS. 4A and 4B to illustrate possible multi-layer structures, which can incorporate one or more sheets 142. FIGS. 4A and 4B present two example embodiments.

FIG. 4A presents an example embodiment of a sandwich structure 150, which may more generally be referred to as a multi-layer structure, having of two stiffer skins 152 and a core 154 having a density lower than the skins 152. One or both of the skins 152 can have 10%, 20% or more, by weight, of graphitic material, and have a density between 0.5 $g/cm^3$ and 2 $g/cm^3$. In certain embodiments, it can be desirable for the skin to have between 10% and 100% by weight of graphitic material. The core 154 can be porous material, such as a foam, for instance, and have a density between 0.01 $g/cm^3$ and 1 $g/cm^3$. The core 154 can be a graphitic material foam or another type of foam, which can be porous or otherwise made of less dense material. In the configuration of the sandwich structure 150 shown in FIG. 4A, the core 154 is foam material which is laminated between two sheets 142, forming the skins 152. In an alternate embodiment, there can be one core 154 and only one skin 152 on only one side of the core 154, for instance, and such type of structure would also be considered a multi-layer structure.

The graphitic material skin(s) 152 can have a thickness 156 between 0.01 micron and 1 cm, for instance. In making a multi-layer structure specifically for use in an acoustic transducer, the thickness 156 of one or both skins 152 can be between 3 microns and 500 microns, more likely between 5 microns and 200 microns. It is understood that in alternate embodiments, the graphitic material skins 152 on either side of the core 154 can have different thicknesses. The core thickness 158 can vary from one embodiment to another, such as between 30 microns and 5 cm. In the context of acoustic transducers, the core 154 can be of less than 2 mm in thickness 158, preferably between 30 microns and 1 mm. It can be desirable to have a thickness ratio of the skin layer(s) 152 to the core layer 154 between 1:1000 and 1:1, preferably between 1:100 and 1:5.

Figures 5A, 5B:
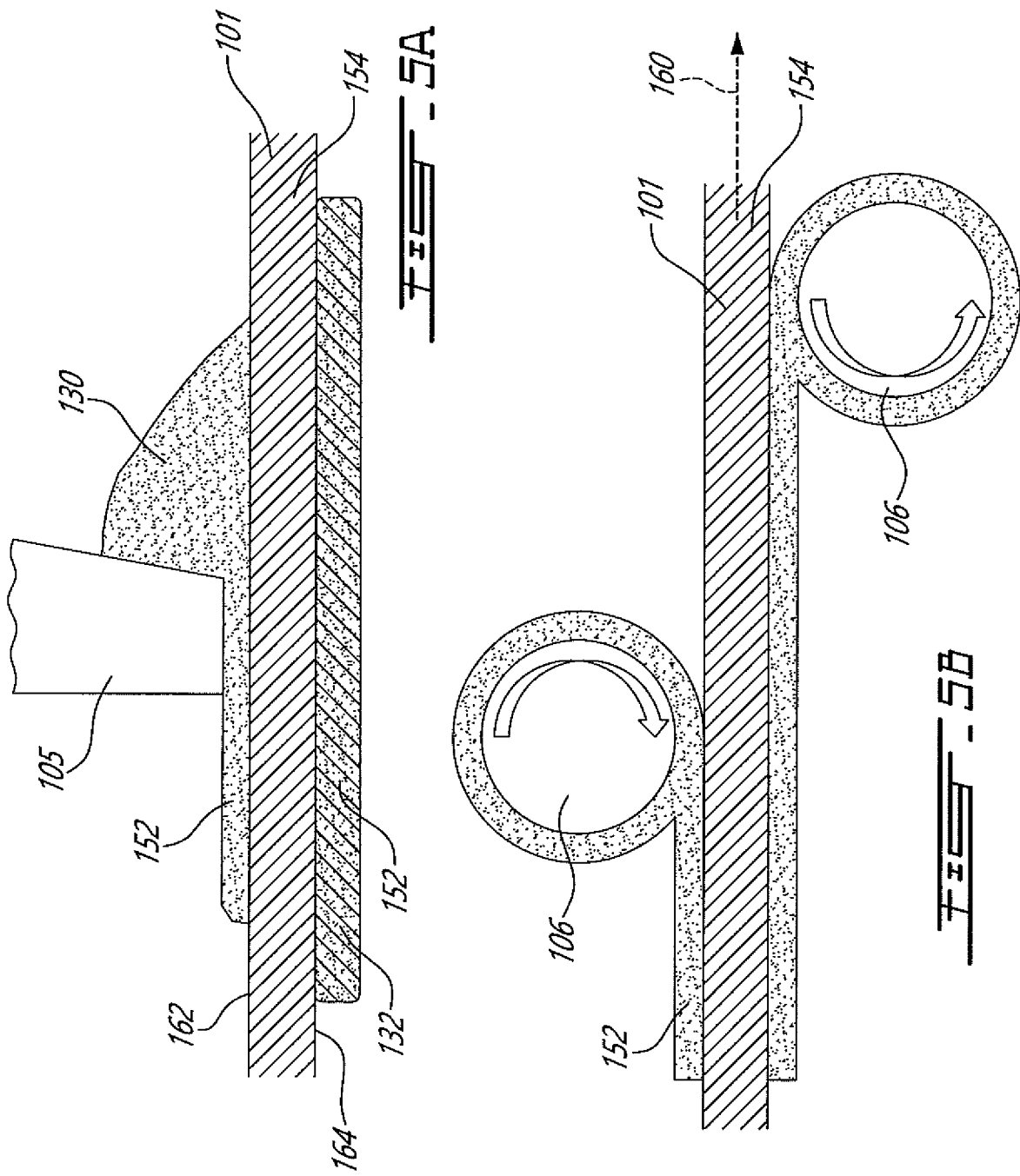
FIGS. 5A and 5B present two embodiments of the fabrication of graphitic material sandwich composite.

In one example embodiment, the sandwich structure 150 of FIG. 4A can be produced by forming the graphitic material skins 152 directly onto the core 154, using the core 154 as a substrate 101, in which case it can be preferred to use a formulation 130 which incorporates one or more polymers 134 having adhesive properties. FIG. 5A presents such an embodiment wherein the graphitic material skins 152 are formed by dual side blade casting—that is, formed by spreading the graphitic formulation 130 on the core 154, forming the substrate 101, with a sheering element 105, which is a doctor blade in this particular embodiment, and which is then evaporated. FIG. 5B presents another such embodiment where the graphitic material skins 152 are formed by dual side roll casting, where the roll coater(s) 106 form the graphitic material skins as the core 154, forming the substrate 101, is moved 160 in relation to the roll coater(s) 106. It is understood that in alternate embodiments the roll coaters may be moved in relation to or along the surface of the substrate 101, while maintaining the substrate 101 stationary. In other examples, the graphitic material skins 152 can be deposited onto the core 154 (or substrate 101) via vacuum deposition, or another forming technique, for instance. The polymer(s) 134 can be selected from the group including polyethylene glycol (PEG), cellulose ethers including but not limited to carboxymethylcellulose (CMC), hydroxypropymethlylcellulose (HPMC), Methylcellulose (MC), Hydroxypropylcellulose (HPC), Hydroxyethylcellulose (HEC), Polyvinyl-alcohol (PVA), Polyvinylpyrrolidone (PVP) and polyethylenimine (PEI), for instance. Cellulose ether, such as carboxymethylcellulose (CMC), hydroxypropymethlylcellulose (HPMC), Methylcellulose (MC), Hydroxypropylcellulose (HPC), Hydroxyethylcellulose (HEC), can be preferred over other polymers for their adhesive properties in some embodiments where adhesiveness is desired.

In another example embodiment, the graphitic material skins can be produced separately onto corresponding substrates, peeled off, and adhered onto the core using an adhesive. In yet another embodiment, the graphitic material skins can be produced on a substrate and peeled off as described in relation to FIG. 3A and adhered to a core in a manner as described in relation to FIG. 3B.

In certain embodiments, an adhesive such as epoxy can applied between the graphitic material and core to assure well-bonded interfaces between the core and the skins, which can favor structural integrity of the sandwich structures.

In another embodiment, satisfactory bonding between the core and the skin can be achieved without the need for applying a distinct adhesive between the skin and the core. As shown in FIG. 5A, the graphitic material skin 152 can be deposited a second side 162 of the core 154, which may be foam for instance, once a first side 164 of the core is bonded to a graphitic material 132, forming the graphitic material skin 152. The graphitic material skins 152 can be subsequently formed following a method as described above. As is perhaps best seen in FIG. 5B, the graphitic material skins 152 can also be deposited and bonded simultaneously to both sides of the core 154, which may also be foam in this case, by using a double head roll coating technique, using two roll coaters 106 which apply the graphitic material 132 to the core 154 and form the graphitic material skins 152.

Returning to FIG. 4B, this embodiment presents another example of a sandwich structure 150 having two stiff skins 152 and a graphene-based porous core 154 such as a graphitic material foam. The exact configuration of this sandwich structure 150 is shown in FIG. 4B. The skins 152 can be made of graphitic material 132 having a higher density than the graphitic material foam of the core 154, or of other higher density materials.

Sandwich structures 150 can be used in a wide variety of applications other than audio. For instance, they can be used in building lightweight structural panels in the construction, aerospace, automotive and sport equipment (e.g. bicycles, drones) industries, and in many embodiments and contexts where load bearing components are required. In an aircraft, to name one possible example, a sandwich structure incorporating a core and/or one or two graphitic material skins, such as is seen in FIG. 4A or 4B for example, can be used for aircraft floors, aircraft cabins, blades, blade housings, propellers, etc.

Multiple layers structures incorporating one or more sheet(s) can also be formed by depositing or adhering layers on top of one another, using the previous layer or layers as a substrate for a subsequent layer. Multiple depositions can be repeated on a dry graphitic material surface to stack up subsequent graphitic material layers. FIGS. 6A and 6B present examples where a second layer 166 of graphitic material 132 can be casted on top of a first layer 168 of graphitic material 132. Upon drying, this can allow the formation of multi layer structure 170 having one or more layer 166, 168 of graphitic material 132 where the properties and isotropy can different or be the same from one layer to another. It is understood that either one or both of the first layer and/or second layer can be made of another material without departing from the present disclosure. For instance, in an alternate embodiment, the second layer can be made of another material that is not graphitic material and plays the role of the substrate for the first layer being formed on it. Similarly, in yet another embodiment, the second layer may be formed of a graphitic material while the first layer, being formed on top of it is made of another material which is not a graphitic material.

This technique can be harnessed, for instance, in forming a multi-layer sheet having uniform mechanical properties in all orientations, which can be useful, for instance, in audio (acoustic transducer) applications. Indeed, this may be achieved by orienting the spreading orientation of subsequent layers in different orientations. For instance, one can alternate the orientation of subsequent layers by 90 degrees, or otherwise breakdown the span into a greater subset of angles corresponding to the different number of layers. In one example, for instance, the orientation of each layer can be shifted by 60 degrees clockwise relative to the former along an axis transversal to the plane formed by each one of the layers, and a total of 3 or 6 layers can be used in a manner for the overall sheet to have uniform mechanical properties.

Figure 7:
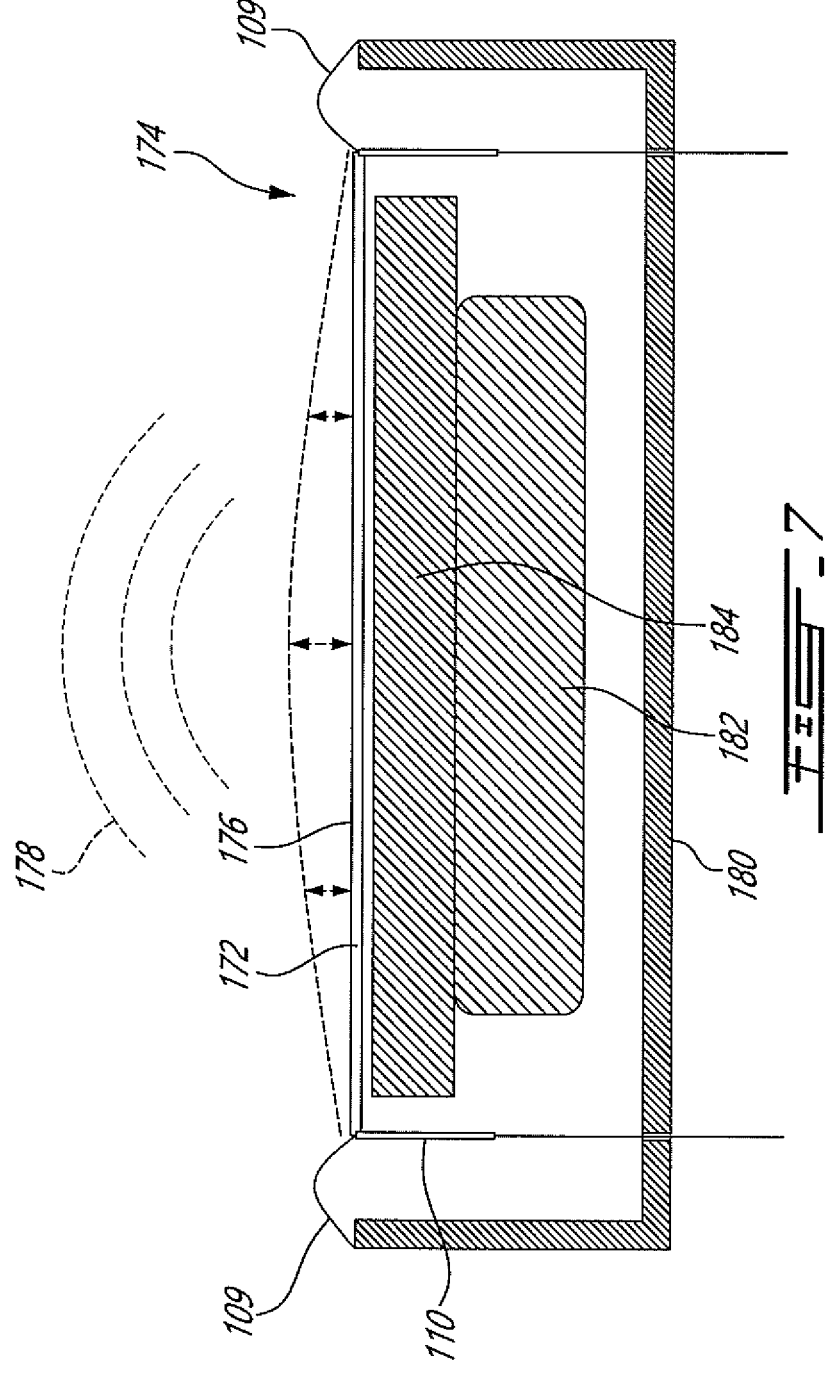
FIG. 7 presents an assembly of a sandwich sheet in a microspeaker transducer in accordance with one example.

As shown in FIG. 7, multi-layer sheets 176 can have applications for thin, lightweight, ridged panels including the acoustic membrane 172, sometimes referred to as a sound 178 producing diaphragm, of an acoustic transducer 174 such as a loudspeaker or a microphone. The microspeaker acoustic transducer 174 here being shown as a general schematic including a back plate 180, a magnet 182, a pole plate 184, a voice coil 110 and its acoustic membrane 172, which produces sound 178, held with a suspension 109. A sheet used as an acoustic membrane 172 as described above can have various shapes, such as circular, rectangular, square, oval, etc. and is not limited the structure of the embodiment shown in FIG. 7. Typical dimensions of the acoustic membrane are of 10 mm by 10 mm, but the dimensions can vary depending on the application, such as between 2 mm and 10 cm for each side in the case of a rectangular membrane, for instance.

It will be understood that sheet structures incorporating one or more sheet(s) can be used in other possible applications where materials having a good weight to structural resistance can be useful. This can be the case in the construction industry and/or for sound isolation, for instance.

Figure 8:
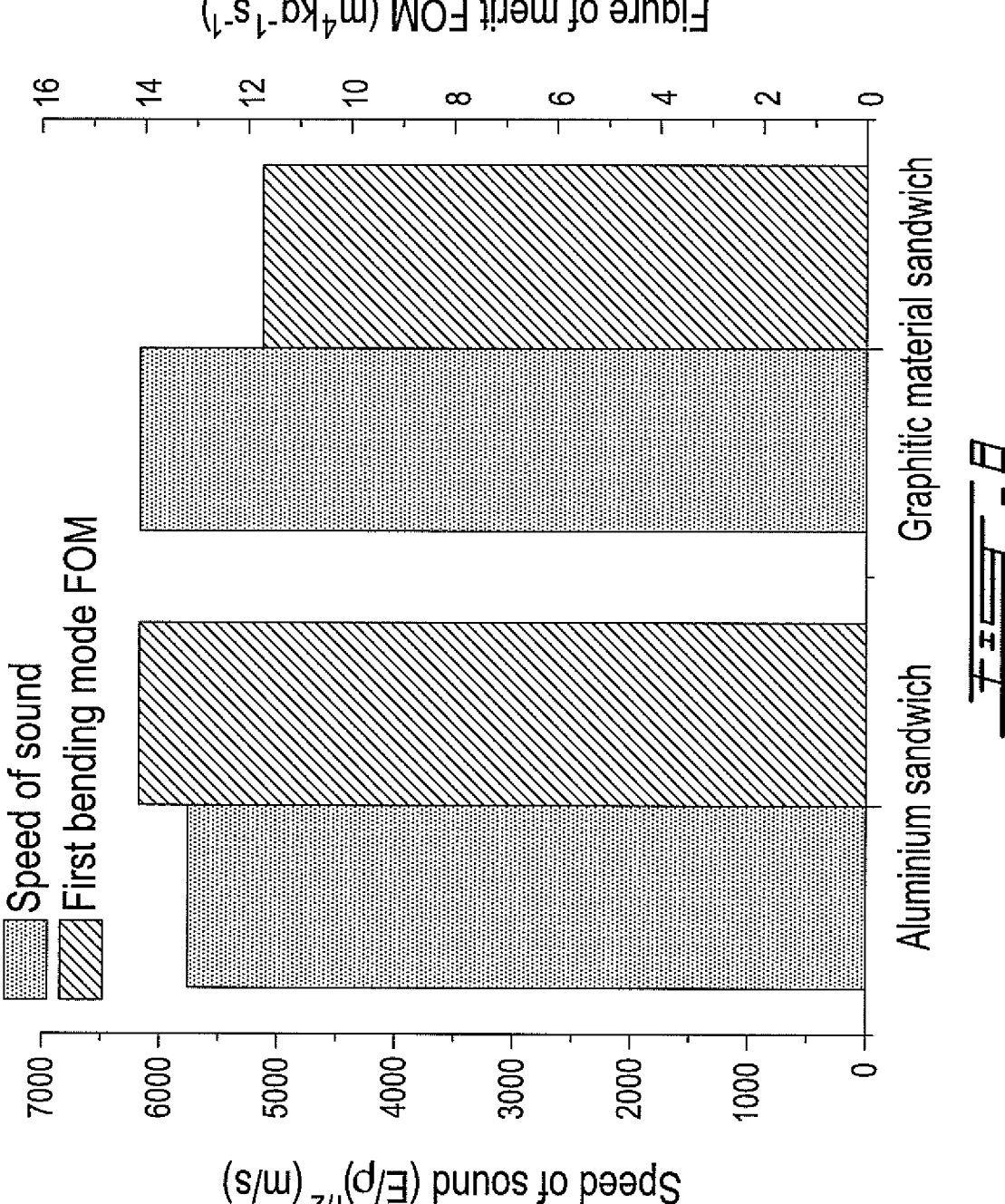
FIG. 8 is a graph showing the mechanical properties of a sandwich structure incorporating graphitic material in comparison with a different reference material.

FIG. 8 compares a sandwich structure 150 having graphitic material skins (Graphitic material sandwich) as was previously discussed in relation to FIGS. 4A and 4B to a sandwich structure having aluminum skins (Aluminum Sandwich). FIG. 8 shows that a composite sandwich structure 150 with graphitic material further increases the specific modulus by 17% compared to bare graphitic material, as is perhaps best seen in FIG. 2. The graphitic material sandwich remains competitive when compared to its Aluminum counterpart by showing a 21% increase in the natural frequency of the first bending mode, which is proportional to the Figure of merit (FOM).

In the context of some example sandwich structures 150 (i.e. multi-layer structures) where the individual skin 152 thickness 156 is below 20 um, it may be preferable to use graphene oxide, reduced graphene oxide, graphite oxide and/or reduced graphite oxide instead of graphene or graphite.

With reference to FIGS. 9A to 9E and FIGS. 11 to 12, another aspect will now be presented. In accordance with this aspect, a formable graphitic material structure incorporating one or more graphitic material sheets can be produced in a manner to be formable, including or omitting the use of a core. Such a structure, which can initially be planar for instance, can then be formed into a more complex structure as a function of the intended end use. A formable graphitic material structure can be formed by techniques as presented above, or by other techniques such as vacuum or pressure filtration, and can be formed with any quantity of sheets, cores and/or combination of materials. For instance, in one embodiment, the formable graphitic material structure is a sandwich structure having a core 154 and a plurality of skins 152 as was previously shown in reference to FIGS. 4A and 4B. In another embodiment, the formable graphitic material structure is a single sheet 142 formed using the method discussed in FIGS. 1A and 1B. It will be understood that other structure can be used without diverging from the present disclosure.

To achieve the formable graphitic material structure, the active materials in the formulation 130 (excluding solvent) can include between 10% and 75% of one polymer or polymer mixture 134 exhibiting thermoformable properties. The active materials can include between 25% and 90% of graphitic material 132. The active materials can be incorporated into 0.5% to 10% by weight of a formulation 130 having 90% to 99.5% solvent, for instance, to produce a sheet using the techniques presented above. The polymer(s) 134 can be selected from the group including polyethylene glycol (PEG), sodium carboxymethylcellulose (NaCMC), hydroxypropymethlylcellulose (HPMC), Methylcellulose (MC), Hydroxypropylcellulose (HPC), Hydroxyethylcellulose (HEC), Polyvinyl-alcohol (PVA), Polyvinylpyrrolidone (PVP) and polyethylenimine (PEI), for instance. In the specific context of favoring thermoformability, polyethylene glycol (PEG) can be particularly suitable in many embodiments. The formulation 130 can also include ascorbic acid, ascorbate salts, and/or dopamine and/or other additives. Additional cross-linkers 136 can also be used if desired, such as in a range of 300 Da to 5 MDa, for instance.

In many applications, the weight percentage of the polymer 134 in the active materials will be lower than 50%, to avoid impeding the structural properties of the graphitic material 132, and in many cases, there is no need for a large quantity of polymer 134 to achieve thermoformable properties. It may, nonetheless, be preferred to maintain a weight percentage of polymer 134 of at least 5% in the active materials to achieve suitable thermoformable properties in some embodiments, and of at least 25% in other embodiments. In certain embodiments, it can be desirable for the proportion of polymer(s) 134 with respect to the graphitic material 132 be between 1:9 and 4:1, or between 3:7 and 7:3. In embodiment with these proportions, the use of polyethylene glycol (PEG) can be of particularly desirable.

Once the structure has been produced, which can involve forming graphitic material sheets 142 directly on a substrate 101 which forms part of the structure, in which case the substrate 101 can alternatively be referred to as the core 154, or forming one or more sheets 142 on a temporary substrate 101 from which it is then peeled off, for instance, and where the sheet(s) 142 can then proceed to be thermoformed. For simplicity sake, the examples discussed below will be discussed in relation to a structure referred to simply as a single sheet. However, it will be understood that such a sheet can be a structure as described above.

Figure 9:
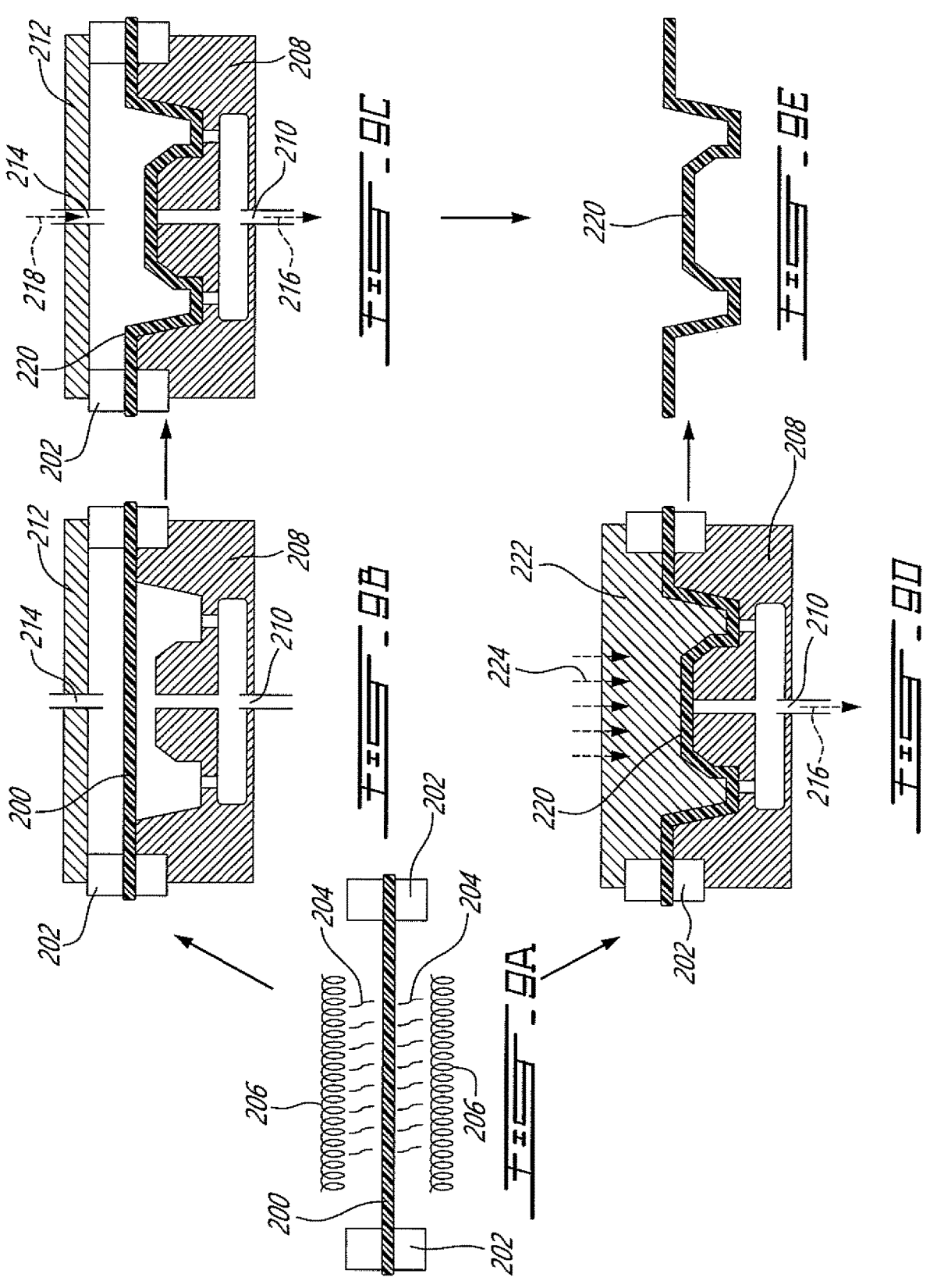
FIGS. 9A to 9E present embodiments of a method for preparing an article comprising a thermoformable material structure, including: Heating of the material structure in FIG. 9A; Mounting the material structure on a thermoforming mold in FIG. 9B; Vacuum forming in FIG. 9C; Counter die pressing in FIG. 9D, and Removal of formed graphitic material in FIG. 9E.

An embodiment of a method for forming/imparting a more complex shape, to an initially planar sheet is illustrated in FIG. 9A. FIG. 9A is a sectional view of the sheet 200, fixed by clamps 202. The sheet 200 is heated 204 above the softening temperature by heating elements 206, such as electric heater coils or infrared lamps. Then, as is perhaps best seen in FIG. 9B, the sheet 200 is transferred to the forming mold 208 with a vacuum outlet 210. The forming mold 208 is preheated and maintained above the softening temperature of the sheet 200. The lid 212 of the forming mold 208 with the gas inlet 214 is attached. In FIG. 9C, a vacuum 216 is applied by the vacuum outlet 210 and pressure 218 is applied by the inlet 214 to start the thermoforming process. In this example, both the vacuum 216 and the pressure 218 are maintained for an identical amount of time. In some cases, only one of either the vacuum 216 or pressure 218 is required for the thermoforming process. In the case that only the vacuum 216 applied, the lid 212 is not required and may be entirely omitted. In the process shown in FIGS. 9A to 9C, after the thermoforming process is complete, the thermoformed sheet 220 is detached from the forming mold 208, as perhaps best seen in FIG. 9E, for post-processing such as trimming. An alternate method of thermoforming the sheet 200 is shown in FIG. 9D, where the thermoformable graphitic material sheet 200 may be formed by compression molding. After attaching the sheet 200 to the forming mold 208, a counter shaped lid 222 compresses the sheet 200 with the pressure 224 applied. The pressure 224 is maintained during the compression molding. Then, the thermoformed sheet 220 is detached from the mold 208, as perhaps best seen in FIG. 9E, for post-processing such as trimming for remove excess material to provide finished article. As is shown in FIG. 9D, the compression molding can be done in combination with the application of a vacuum 216 via the vacuum outlet 210. However, it is understood that the application of the vacuum 216 can be omitted altogether without departing from the present disclosure. It can, however, be desirable to maintain an outlet, such as the vacuum outlet 210 in order to permit for gases to exit the forming mold 208 as the counter shaped lid 222 is received and thermoforms the sheet 200.

As is perhaps best shown in FIG. 11, the thermoformable sheet 200 softens as temperature increases, this is accordingly shown in the dynamic material analysis (DMA_temperature sweep graphic 226. As can be seen, the storage modulus of the graphitic material gradually decreases by more than 50% from 25° C. to around 100° C. and becomes stable post 100° C.

Figure 12:
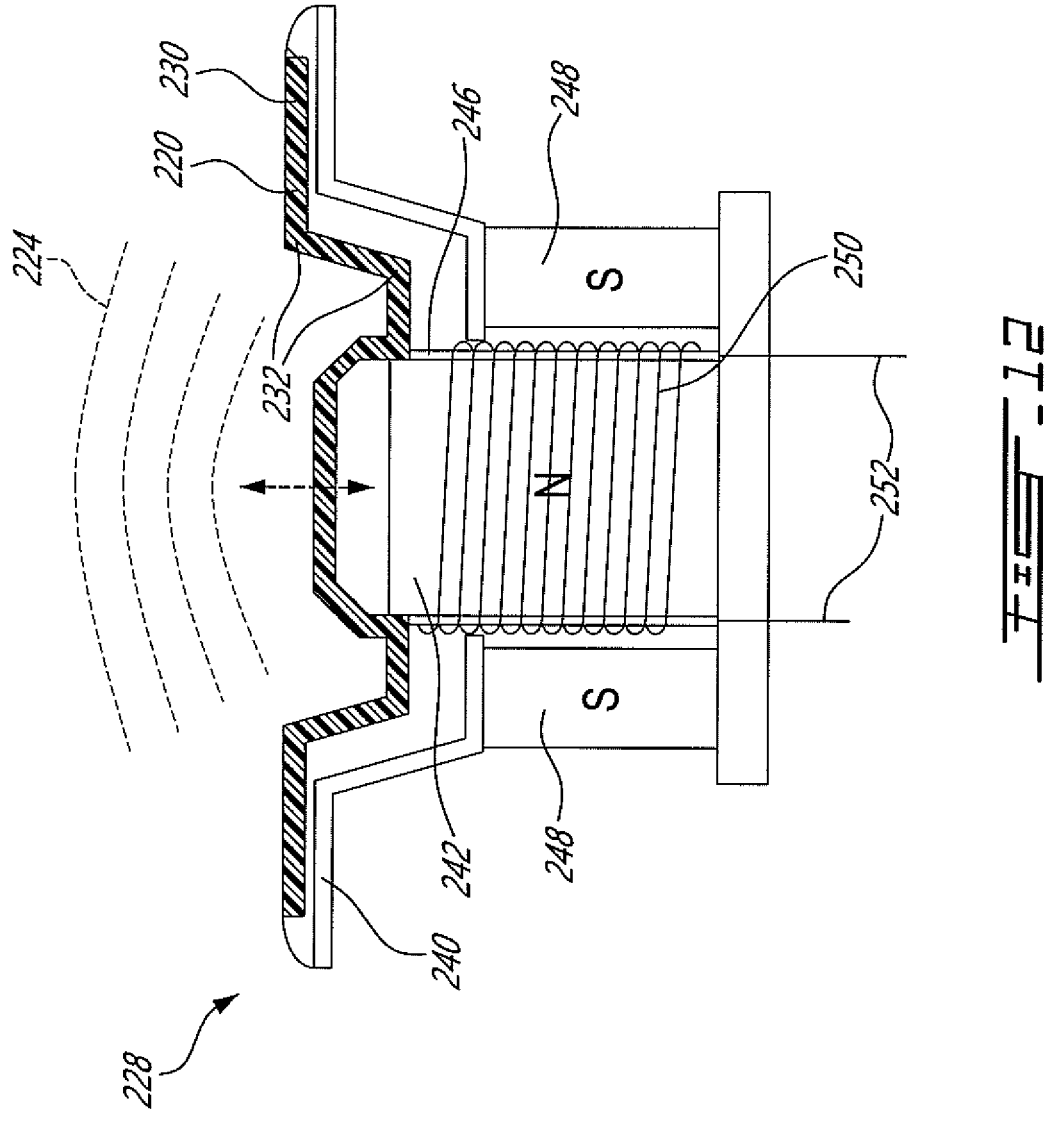
FIG. 12 is a schematic illustrating the use of the formed sheet as a loudspeaker membrane.

FIG. 12 presents a thermoformed sheet 220 obtained by thermoforming through the a method as presented in FIGS. 9A to 9E incorporated to an acoustic device 228. As can be see, the thermoformed sheet 220 is used in the context of acoustic transducer diaphragm 230 capable of generating sound waves 244. The thermoforming of the sheet 200, 220 will typically impart a bend forming a closed shape. Depending on the geometry, which can be square, rectangular or circular to name a few possible examples, the closed shape can be adapted to match the geometry of the acoustic device 228. In the example shown in FIG. 12, for instance, two circular closed-shape bends 232 defining a truncated cone-shaped section therebetween form part of the non-planar shape imparted by the thermoforming. It will be understood that the FIG. 12 shows a general schematic of an embodiment of an acoustic device 228 including a frame 240, a permanent magnet 242, a former 246, pole pieces 248, a voice coil 250 and electrical leads 252 receiving a voltage signal. It will be understood that, in alternate embodiments, the acoustic device 228 can have a differing structure to the one shown in FIG. 12 without departing from the present disclosure.

In other example embodiments, it can be preferred to make sheets with graphene or graphite, such as a polymer composite sheet with 15 percent weight or more of flake graphite or graphene, in which case it can be preferred for the polymer to be a thermoplastic such as Polyethylene terephthalate (PET), polycarbonate (PC) or polyvinyl chloride (PVC). In one example embodiment, two pieces of graphite-polymer composites comprising 15 percent weight or more of flake graphite and a thermoplastic polymer are bonded to a polymer foam core via adhesive to form a sandwich structure. The sandwich structure can be further thermoformed with embossment to increase geometrical stiffness. The flat sandwich structure and the embossed sandwich structure can be used as loudspeakers acoustic membranes, for instance. In another example embodiment, two pieces of graphene-polymer composites comprising of at least 15 percent weight graphene and a thermoplastic polymer are bonded to a polymer foam core via adhesive as a skin layer to form a sandwich structure. The sandwich structure can be further thermoformed with embossment to increase geometrical stiffness. The flat sandwich structure and the embossed sandwich structure can be used as loud-speakers membranes, for instance.

With reference to FIG. 10A to 10E, another aspect will now be presented. In accordance with this aspect, a formable graphitic material structure incorporating one or more graphitic material sheets can be produced in a manner to be wet formable, including or omitting the use of a core. Such a structure, which can initially be planar for instance, can then be formed into a more complex structure as a function of the intended end use. A wet formable graphitic material structure can be formed by techniques as presented above, or by other techniques such as vacuum or pressure filtration, and can be formed with any quantity of sheets, cores and/or combination of materials. For instance, in one embodiment, the formable graphitic material structure is a sandwich structure having a core 154 and a plurality of skins 152 as was previously shown in reference to FIGS. 4A and 4B. In another embodiment, the formable graphitic material structure is a single sheet 142 formed using the method discussed in FIGS. 1A and 1B. It will be understood that other structure can be used without diverging from the present disclosure.

To achieve the formable graphitic material structure, the active materials in the wet formable material formulation 130 (excluding solvent) can include between 10% and 75% of one polymer or a polymer mixture 134, and more preferably between 25% and 50% by weight of one polymer or a polymer mixture 134. The active materials can include between 25% and 90% of graphitic material. The active materials can be incorporated into 0.5% to 10% by weight of a formulation having 90% to 99.5% solvent, for instance, to produce a sheet using the techniques presented above. The polymer(s) 134 can be selected from the group including polyethylene glycol (PEG), sodium carboxymethylcellulose (NaCMC), hydroxypropymethlylcellulose (HPMC), Methylcellulose (MC), Hydroxypropylcellulose (HPC), Hydroxyethylcellulose (HEC), Polyvinyl-alcohol (PVA), Polyvinylpyrrolidone (PVP) and polyethylenimine (PEI), for instance. The formulation 130 can also include ascorbic acid, ascorbate salts, and/or dopamine and/or other additives. Additional cross-linkers 136 can also be used if desired, such as in a range of 300 Da to 5 MDa, for instance.

In many applications, the weight percentage of the polymer 134 in the active materials will be lower than 50%, to avoid impeding the structural properties of the graphitic material, and in many cases, there is no need for a large quantity of polymer 134 to achieve wet formable properties. It may, nonetheless, be preferred to maintain a weight percentage of polymer 134 of at least 25% in the active materials to achieve suitable wet formable properties. In certain embodiments, it can be desirable to have a proportion of polymer 134 to graphitic material between 1:99 and 4:1, and even more desirable to have a proportion between 1:19 and 1:1. In such proportions, the use of cellulose ethers can be particularly desirable.

Once the wet formable structure has been produced, which can involve forming sheets 142 directly on a substrate 101 which forms part of the structure, in which case the substrate 101 can alternatively be referred to as the core 154, or forming one or more sheets 142 on a temporary substrate 101 from which it is then peeled off, for instance, and where the sheet(s) 142 can then proceed to be wet formed. For simplicity sake, the example discussed below will be discussed in relation to a structure referred to simply as a single sheet. However, it will be understood that such a sheet can be a structure as described above.

Figure 10:
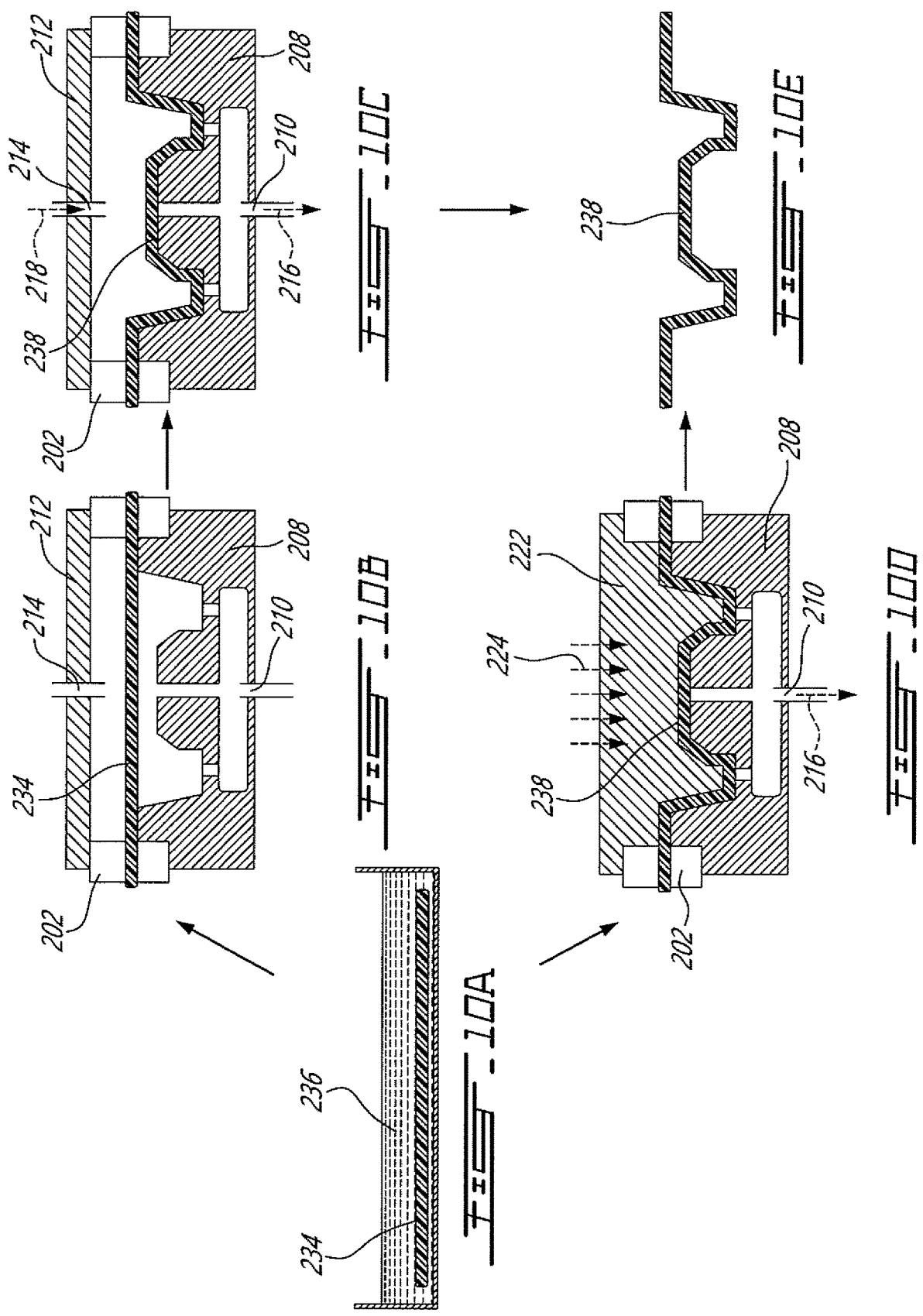
FIGS. 10A to 10E present embodiments of a method for preparing an article comprising a wet formable material structure, including : Wetting the material structure to make it formable in FIG. 10A; Mounting the material structure on a thermoforming mold in FIG. 10B; Vacuum forming in FIG. 10C; Counter die pressing in FIG. 10D and Removal of formed graphitic material in FIG. 10E.

An embodiment of a method for forming a wet formable graphitic material sheet 234 is given in the following description and is perhaps best see in FIGS. 10A to 10E. The wet formable sheet 234 is wetted by soaking the sheet 234 in a wetforming solution 236 such as water, ethanol, or mixture of ethanol and water, optionally containing a solvent that can reduce the swelling of the sheet 234, such as calcium salt. The wetting step is perhaps best seen in FIG. 10A. The softened sheet is then transferred to the forming mold 208 shown in FIG. 10B or 10D. Similar to the embodiments described in relation to FIGS. 9B to 9E, the wet molding process can either use a vacuum 216 applied through a vacuum outlet 210 alone or in combination with a pressure 218 applied through a gas inlet 214 of the lid 212, as is best seen in FIGS. 10B and 10C, or a mechanical compression 224 applied via the use of counter shaped lid as shown in FIG. 10D for the wet forming process. Once the sheet 238 is dried, the sheet 238 is detached from the mold 208, as perhaps best seen in FIG. 10E, for post-processing such as trimming. As with the embodiment described above in relation to FIG. 9D, the graphitic material sheet 238 formed by compression molding with a counter feature lid 222 as illustrated in FIG. 10D can have a vacuum 216 applied through the vacuum outlet 210 simultaneously to the application of the compression 224 force of the counter shaped lid 222. However, it will be understood that the vacuum 216 can be omitted without departing from the present disclosure.

Several more specific examples will now be presented.

EXAMPLE 1

Fabrication of Sheets Through Solvent Casting Method

Graphene oxide (GO) sheets are prepared using modified Hummer's method followed by subsequent washing and drying to obtain 100% dry powder. Then, 3 g of graphene oxide powder is dispersed in 97 g of deionized water using an overhead mixer stirred at 600 rpm for 10 minutes. The dispersion is then sonicated at 40 kHz in an ultrasonic bath for 30 minutes to fully exfoliate all GO sheets. Crosslinker is added to the formulation to make a final crosslinker concentration of 100 mM in the formulation. Then, 1.5 ml of ammonium hydroxide (28-30 percent weight) is added into the formulation and mixed using overhead stirrer at 900 rpm for 10 minutes.

The final formulation is spread on a flat hydrophilic PET substrate and a uniform layer of formulation is coated over the substrate surface by sliding a doctor blade with a gap height of 1 mm. The PET substrate along with the GO dispersion is then transferred into a convection oven to dry at 50° C. overnight—that is, at least 8 hours, or at least 12 hours. After drying, the dry sheet is peeled from the substrate with a thickness of about 25 μm.

Once peeled from the substrate, the sheet is adhered on either side of a 200 μm thick polymethacrylimide (PMI) foam with a density of around 0.05 g/cm$^3$ using a 4 μm to 12 μm thick layer of epoxy. After the epoxy has dried, the multilayer sandwich structure can be cut and assembled into a device such as a loudspeaker or can be directly used in applications such as sound isolation.

EXAMPLE 2

Fabrication of Layered Sheets Using a Multi-Pass Approach 1.5 g of Graphene oxide (GO) powder is dispersed in 48.75 g of deionized water using an overhead mixer stirred at 600 rpm for 10 minutes. The formulation is then sonicated at 40 kHz in an ultrasonic bath for 30 minutes to fully exfoliate all GO sheets. A crosslinker is added to the suspension to make a final crosslinker concentration of 100 mM in the formulation. Then, 0.75 ml of ammonium hydroxide (28 to 30 percent weight) is added into the formulation and mixed using overhead stirrer at 900 rpm for 10 minutes.

The final formulation is spread on a flat hydrophilic PET substrate and a uniform layer of formulation is coated over the substrate surface by sliding a doctor blade with a gap height of 0.5 mm. The PET substrate along with the GO formulation is then transferred into a convection oven to dry at 50° C. overnight—that is, at least 8 hours, preferably at least 12 hours. After drying, another layer of GO formulation prepared according to previous steps is coated on top of the dry sheet. The doctor blade is sled in a direction 90° (perpendicular) to that of the first sheet. After the deposition of the new layer, the plurality of sheets are dried again in the convection oven at 50° C. overnight—that is, at least 8 hours, preferably at least 12 hours. The dry sheets are finally peeled from the substrate together with a thickness of about 50 μm.

EXAMPLE 3

Fabrication of a Sandwich Structure Through the Solvent Casting Method 3 g of Graphene oxide (GO) powder is dispersed in 71 g of deionized water using an overhead mixer stirred at 600 rpm for 10 minutes. A crosslinker is added to the formulation to make a final crosslinker concentration of 100 mM in the formulation followed by the addition of 26 g of sodium carboxymethylcellulos (NaCMC—low viscosity grade) solution to make a weight ratio of 3:7 relative to the composition of GO in the sheet to be formed. The formulation is then mixed for 10 minutes at 900 rpm. Then, 1.5 ml of ammonium hydroxide (28 to 30 percent weight) is added into the formulation and mixed using overhead stirrer at 900 rpm for 10 minutes.

The final formulation is spread on a 200 μm thick polymethacrylimide (PMI) foam with a density of around 0.05 g/cm³ and a uniform layer of formulation is coated over the PMI foam surface by sliding a doctor blade with a gap height of 1 mm. The PMI substrate along with the GO formulation is then air dried at room conditions (temperature and pressure). After drying, the same deposition process is repeated on the other side of PMI foam. The final thickness of the sandwich structure is about 236 μm.

EXAMPLE 4

Fabrication of a Sandwich Structure with a Graphitic Material Foam Core Through the Solvent Casting Method Graphene oxide (GO) sheets are prepared using modified Hummer's method followed by subsequent washing and drying to obtain 100% dry powder. Them, 3 g of graphene oxide powder is dispersed in 97 g of deionized water using an overhead mixer stirred at 600 rpm for 10 minutes. The formulation is then sonicated at 40 kHz in an ultrasonic bath for 30 minutes to fully exfoliate all GO sheets. A crosslinker is added to the formulation to make a final crosslinker concentration of 100 mM in the formulatiom. Then, 1.5 ml of ammonium hydroxide (28 to 30 percent weight) is added into the formulation and mixed using an overhead stirrer at 900 rpm for 10 minutes.

The final formulation is spread on a flat hydrophilic polyethylene terephthalate (PET) substrate and a uniform layer of formulation is coated over the substrate surface by sliding a doctor blade with a gap height of 1 mm. The PET substrate along with the GO dispersion is then transferred into a freeze drier at −100° C. for 2 days at a pressure of 20 mTorr. After drying, the dry sheet is peeled from the substrate with a thickness of about 300 μm.

Once peeled from the substrate, the graphitic material foam core is adhered on either side with a 8 μm to 20 μm thick Aluminum skin using a 4 μm to 12 μm thick layer of epoxy. After the epoxy has dried, the multilayer sandwich structure can be cut and assembled into a device such as a loudspeaker or can be directly used in applications such as sound isolation.

EXAMPLE 5

Fabrication of a Thermoformable Graphitic Material and Forming 1 kg of graphene oxide powder is mixed with 19 kg water by vigorously stirring the products together using an overhead stirrer at 500 rpm for 10 min. Then, the graphene oxide formulation is sonicated in a sonicator bath at 40 kHz for 10 minutes to increase its viscosity. Then, 10 mL of ammonium hydroxide solution and 5 ppm of an antifoamer are added into the graphene oxide formulation by vigorously stirring using the overhead stirrer at 500 rpm for 10 minutes. Once the color of graphene oxide dispersion becomes black, 10 kg of 5 percent weight polyethylene glycol (PEG - with an average molecular weight of 300,000) solution and a crosslinker are added into graphene oxide formulation. The mixture is stirred at 500 rpm for an additional 30 min period. The thus obtained material formulation is hereinafter referred to as "A1".

A wet sheet is casted using the A1 formulation with a doctor blade on a flat hydrophilic polyethylene terephthalate (PET) substrate. The gap height of the applicator is set at 1.5 mm. The layer is cast by manually dragging the applicator. Then the wet sheet is dried in the oven. After drying, the thermoformable sheet is peeled from the PET substrate for further processing or thermoforming.

Mechanical Tests

The viscoelastic properties of sheets were measured using the Q800 dynamic mechanical analysis (DMA) analyzer from TA instruments inc. All samples were cut into rectangular test strips with sizes of 5 mm by 40 mm using a laser cutter. The test strips were mounted on the DMA tension clamps for different tests. The viscoelastic properties of the strips were measured at a frequency of 1 Hz, at a temperature of 30° C. and a strain of 0.025%. The bending modulus of the sandwich structures were measured using 3-point bending test with a test strip size of 20 mm by 1 mm. DMA temperature sweeps were conducted to understand the thermoforming properties of the thermoformable material. The viscoelastic properties of the material were recorded as a temperature ramped from 25° C. to 120° C. at a rate of 3° C./minute.

EXAMPLE 6

Fabrication of a Wet Formable Sheet and Forming 1 kg of graphene oxide powder is mixed with 19 kg water by vigorously stirring using a overhead stirrer at 500 rpm for 10 min. Then, the graphene oxide formulation is sonicated in a sonicator bath at 40 kHz for 10 min to increase its viscosity. Then, 10 mL ammonium hydroxide solution and 5 ppm of an antifoamer are added into the graphene oxide formulation by vigorously stirring using the overhead stirrer at 500 rpm for 10 minutes. Once the color of graphene oxide dispersion becomes black, 2.5 kg of 5 percent weight of polyethylene glycol (PEG - with an average molecular weight of 300,000) solution, 2.5 kg of 5 percent weight of Hydroxypropylcellulose (HPC—with an average molecular weight of 300,000) solution and crosslinker are added into graphene oxide formulation. The formulation is stirred at 500 rpm for an additional 30 min period. The thus obtained formulation is hereinafter referred to as "A2".

A wet sheet is cast using the A2 formulation with a doctor blade on a flat hydrophilic Polyethylene terephthalate (PET) substrate. The gap height of the applicator is set at 1.5 mm. The layer is cast by manually dragging the applicator. Then the wet graphitic material layer is dried in an oven. After drying, the wet formable sheet is peeled from the PET substrate for further processing or wet forming using a 50/50 volume ratio water/ethanol mixture.

As can be understood, the examples described above and illustrated are intended to be exemplary only. The scope is indicated by the appended claims.

What is claimed is:

1. A multi-layer structure comprising:
   a core layer having a core thickness between 30 microns and 5 cm and a core density between 0.01 and 0.05 g/cm³; and
   at least two skin layers superposed over one another, each one of the skin layers having an in-plane graphene orientation, the at least two skin layers covering the core layer, each of the skin layers having a skin thickness between 3 microns and 500 microns and at least 10% by weight of a graphitic material, the graphitic material having one or more of graphene oxide, reduced graphene oxide, graphene, graphite oxide, and reduced graphite oxide, each of the skin layers having a skin density of between 0.5 and 2 g/cm³, a thickness ratio of the at least two skin layers to the core layer being of between 1:1000 and 1:5.

2. The multi-layer structure of claim 1, wherein the at least two skin layers have between 20% and 90% of one or more of graphene oxide, graphene, graphite oxide, and reduced graphite oxide.

3. The multi-layer structure of claim 1, wherein the skin thickness is below 20 μm, and the graphitic material is one or more of graphene oxide, graphite oxide and reduced graphite oxide.

4. The multi-layer structure of claim 1, wherein the at least two skin layers have between 10% and 100% by weight of the graphitic material.

5. The multi-layer structure of claim 1, wherein the thickness ratio is of between 1:100 and 1:5.

6. The multi-layer structure of claim 1, wherein the core layer is made of one of wood, wood based material, foam material and porous polymer.

7. The multi-layer structure of claim 1, wherein the graphitic material is one of graphene oxide and reduced graphene oxide.

8. The multi-layer structure of claim 1, further comprising an adhesive layer between the at least two skin layers and the core layer.

9. The multi-layer structure of claim 1, wherein the multi-layer structure is a sandwich structure having the at least two skin layers and a third skin layer sandwiching the core layer, the skin layers having a skin density higher than the core density.

10. The multi-layer structure of claim 9, wherein the core is a graphitic based material foam.

11. The multi-layer structure of claim 1, wherein the graphitic material is graphene oxide.

12. The multi-layer structure of claim 1, wherein the at least two skin layers include a cross-linker.

13. The multi-layer structure of claim 12, wherein the cross-linker is present in a concentration of between 0.01% to 30% by weight per gram of graphitic material.

14. The multi-layer structure of claim 12, wherein the cross-linker is one or more of boric acid (BA), borax (BX), calcium salt, glyoxal, glutaraldehyde (GA), dicarboxylic acids and diamines.

15. The multi-layer structure of claim 1, wherein the at least two skin layers include a polymer.

16. The multi-layer structure of claim 15, wherein the polymer is present in a concentration of 25% to 50% weight of the at least two skin layers.

17. The multi-layer structure of claim 15, wherein the polymer is present in a proportion of between 1:99 and 4:1 of the graphitic material by weight.

18. The multi-layer structure of claim 17, wherein the proportion is between 1:19 and 4:1.

19. The multi-layer structure of claim 18, wherein the proportion is between 1:19 and 3:1.

20. The multi-layer structure of claim 19, wherein the proportion is between 1:9 and 3:7.

21. The multi-layer structure of claim 19, wherein the proportion is of between 1:19 and 1:1.

22. The multi-layer structure of claim 21, wherein the polymer is a cellulose ether.

23. The multi-layer structure of claim 22, wherein the cellulose ether is one or more of carboxymethylcellulose (CMC), hydroxypropymethylcellulose (HPMC), Methylcellulose (MC), Hydroxypropylcellulose (HPC), Hydroxyethylcellulose (HEC).

24. The multi-layer structure of claim 18, wherein the proportion is between 1:9 and 4:1.

25. The multi-layer structure of claim 24, wherein the proportion is between 3:7 and 7:3.

26. The multi-layer structure of claim 25, wherein the polymer is polyethylene glycol (PEG).

27. The multi-layer structure of claim 17, wherein the polymer is one or more of polyethylene glycol (PEG), cellulose ether, Polyvinyl-alcohol (PVA), Polyvinylpyrrolidone (PVP) and polyethylenimine (PEI).

28. The multi-layer structure of claim 1, wherein the multi-layer structure forms an acoustic transducer diaphragm in an electronic device.

29. The multi-layer structure of claim 28, wherein the acoustic transducer diaphragm has a non-planar shape including a bend forming a closed shape on the surface of the multi-layer structure.

30. The multi-layer structure of claim 29, wherein the bend has a truncated cone shape.

31. The multi-layer structure of claim 1 wherein the graphitic material has one or more of graphene oxide, graphene, graphite oxide, and reduced graphite oxide.

32. A multi-layer structure comprising:

a core layer having a core density between 0.01 and 1 g/cm³; and a skin layer covering the core layer, the skin layer having at least 10% by weight of a graphitic material, the graphitic material having one or more of graphene oxide, reduced graphene oxide, graphene, graphite oxide, reduced graphite oxide and graphite, the skin layer having a skin density of between 0.5 and 2 g/cm³, a thickness ratio of the skin layer to the core layer being of between 1:1000 and 1:1;

comprising at least two skin layers superposed over one another, each one of the skin layers having an in-plane graphene orientation, the in-plane orientation being different for the two skin layers.

33. The multi-layer structure of claim 32, wherein the in-plane orientation of each one of the skin layers rotate from one skin layer to the other in a manner to complete one or more rotations between 0 and 180 degrees, the multi-layer structure presenting uniform mechanical properties in all orientations.

34. A multi-layer structure comprising:

a core layer having a core density between 0.01 and 1 g/cm³ and being a graphitic based material foam; and a skin layer covering the core layer, the skin layer having at least 10% by weight of a graphitic material, the graphitic material having one or more of graphene oxide, reduced graphene oxide, graphene, graphite oxide, reduced graphite oxide and graphite, the skin layer having a skin density of between 0.5 and 2 g/cm³, a thickness ratio of the skin layer to the core layer being of between 1:1000 and 1:1.

35. A multi-layer structure comprising:

a core layer having a core thickness between 30 microns and 5 cm and a core density between 0.01 and 1 g/cm³; and at least two skin layers superposed over one another, each one of the skin layers having an in- plane graphene orientation, the at least two skin layers covering the core layer, each of the skin layers having a skin thickness between 3 microns and 500 microns and at least 10% by weight of a graphitic material, the graphitic material having one or more of graphene oxide, reduced graphene oxide, graphene, graphite oxide, and reduced graphite oxide, each of the skin layers having a skin density of between 0.5 and 2 g/cm³, a thickness ratio of the at least two skin layers to the core layer being of between 1:1000 and 1:1 wherein the multi-layer structure has an average density of from 0.1186 g/cm³ to 0.3475 g/cm³.

* * * * *